US012397943B2

(12) United States Patent
Kmiecik et al.

(10) Patent No.: US 12,397,943 B2
(45) Date of Patent: Aug. 26, 2025

(54) HANDHELD STRAPPING DEVICE

(71) Applicant: SAMUEL, SON & CO. (USA) INC., Woodridge, IL (US)

(72) Inventors: Mark Kmiecik, Woodridge, IL (US); Michael A. Graef, Woodridge, IL (US); Rebecca Regan, Woodridge, IL (US); Adam Broda, Woodridge, IL (US); Traci Chapple, Woodridge, IL (US); David Vonderhaar, Woodbridge, IL (US)

(73) Assignee: Samuel, Son & Co. (USA) Inc., Woodridge, IL (US)

( * ) Notice: Subject to any disclaimer, the term of this patent is extended or adjusted under 35 U.S.C. 154(b) by 235 days.

(21) Appl. No.: 18/071,161

(22) Filed: Nov. 29, 2022

(65) Prior Publication Data

US 2024/0174393 A1 May 30, 2024

(51) Int. Cl.
*B65B 13/02* (2006.01)
*B65B 13/32* (2006.01)

(52) U.S. Cl.
CPC .......... *B65B 13/025* (2013.01); *B65B 13/327* (2013.01)

(58) Field of Classification Search
CPC ..... B65B 13/025; B65B 13/185; B65B 13/32; B65B 13/327; B65B 57/02; B65B 57/08
See application file for complete search history.

(56) References Cited

U.S. PATENT DOCUMENTS

| 958,670 A | 5/1910 | Nilsen |
| 1,600,833 A | 9/1926 | McChesney |
| 1,950,477 A | 3/1934 | Burnett |

(Continued)

FOREIGN PATENT DOCUMENTS

| AU | 496889 B2 | 3/1975 |
| BE | 884778 A | 12/1980 |

(Continued)

OTHER PUBLICATIONS

Bender—"Lithium ion technology: Shaping Power Tools" Air Conditioning, Heating, and Refrigeration News. vol. 228, Issue 14, p. Jul. 18, 31, 2006 (4 pages).

(Continued)

*Primary Examiner* — Edward T Tolan
(74) *Attorney, Agent, or Firm* — Foley & Lardner LLP

(57) ABSTRACT

Strapping devices and methods are provided. The strapping device can include a member. The strapping device can include a first actuator coupled with the member to move the member between a first position and a second position. The strapping device can include a sensor to detect an electrical characteristic of the first actuator and to transmit a signal indicative of the electrical characteristic. The strapping device can include a data processing system. The data processing system can receive the signal and determine the member is in contact with a welding component based on the electrical characteristic. The data processing system can determine the second position of the member based on the member being in contact with the welding component. The data processing system can transmit a control signal to the first actuator and a second actuator to initiate a welding cycle with the member at the second position.

18 Claims, 7 Drawing Sheets

(56) References Cited

U.S. PATENT DOCUMENTS

| | | | |
|---|---|---|---|
| 1,963,593 A | 6/1934 | Prindle | |
| 2,007,002 A | 7/1935 | Porter | |
| 2,113,757 A | 4/1938 | Bietso et al. | |
| 2,349,608 A | 5/1944 | Bramble | |
| 2,430,495 A | 11/1947 | Dath | |
| 2,462,167 A | 2/1949 | Dath | |
| 2,661,030 A | 12/1953 | Crosby et al. | |
| 2,986,376 A | 5/1961 | Falck-Pedersen | |
| 3,028,885 A | 4/1962 | Leslie et al. | |
| 3,032,075 A | 5/1962 | Hall et al. | |
| 3,080,148 A | 3/1963 | Knoebel et al. | |
| 3,125,326 A | 3/1964 | Ericsson | |
| 3,194,541 A | 7/1965 | Kocian | |
| 3,206,167 A | 9/1965 | Armington | |
| 3,232,217 A | 2/1966 | Harmon et al. | |
| 3,284,049 A | 11/1966 | Haraden | |
| 3,309,061 A | 3/1967 | Plattner | |
| 3,329,178 A | 7/1967 | Plunkett | |
| 3,360,017 A | 12/1967 | Vilcins | |
| 3,367,374 A | 2/1968 | Meier et al. | |
| 3,442,733 A | 5/1969 | Vilcins | |
| 3,545,723 A | 12/1970 | Raley et al. | |
| 3,583,315 A | 6/1971 | Hebert | |
| 3,586,572 A | 6/1971 | Ericsson | |
| 3,654,033 A | 4/1972 | Angarola et al. | |
| 3,669,799 A | 6/1972 | Vilcins et al. | |
| 3,718,526 A | 2/1973 | Annis | |
| 3,740,087 A | 6/1973 | Back | |
| 3,783,079 A | 1/1974 | Wehr | |
| 3,792,808 A | 2/1974 | Neff et al. | |
| 3,799,835 A | 3/1974 | Gilmore | |
| 3,804,001 A | 4/1974 | Longerich et al. | |
| 3,844,317 A | 10/1974 | Angarola et al. | |
| 3,866,812 A | 2/1975 | Gutjahr | |
| 4,011,807 A | 3/1977 | Kobiella | |
| 4,015,643 A | 4/1977 | Cheung | |
| 4,016,023 A * | 4/1977 | Takami | B65B 13/32 |
| | | | 156/499 |
| 4,020,879 A | 5/1977 | Billett et al. | |
| 4,050,372 A | 9/1977 | Kobiella | |
| 4,155,799 A | 5/1979 | Matsushita et al. | |
| 4,161,910 A | 7/1979 | Leslie et al. | |
| 4,177,724 A | 12/1979 | Johnson, III et al. | |
| 4,220,493 A | 9/1980 | Schlosser et al. | |
| 4,239,096 A | 12/1980 | Smilgys et al. | |
| 4,240,865 A | 12/1980 | Kyts | |
| 4,252,158 A | 2/1981 | Mc Dade | |
| 4,253,227 A | 3/1981 | Bullington | |
| 4,254,703 A | 3/1981 | Fulton et al. | |
| 4,282,907 A | 8/1981 | Massion et al. | |
| 4,289,175 A | 9/1981 | Crittenden et al. | |
| 4,300,976 A | 11/1981 | Wehr | |
| 4,313,779 A | 2/1982 | Nix | |
| 4,328,742 A | 5/1982 | Discavage | |
| 4,398,572 A | 8/1983 | Fromm | |
| 4,435,945 A * | 3/1984 | Rohrig | B29C 65/2053 |
| | | | 156/515 |
| 4,444,097 A | 4/1984 | Wehr et al. | |
| 4,450,032 A | 5/1984 | Wehr | |
| 4,454,808 A | 6/1984 | Wehr et al. | |
| 4,483,516 A | 11/1984 | Wehr | |
| 4,488,926 A | 12/1984 | Rauch | |
| 4,502,911 A | 3/1985 | Discavage | |
| 4,535,730 A | 8/1985 | Allen | |
| 4,536,248 A | 8/1985 | Bullington et al. | |
| 4,559,767 A | 12/1985 | Takami | |
| 4,572,064 A | 2/1986 | Burton | |
| 4,575,994 A | 3/1986 | Takami | |
| 4,607,709 A | 8/1986 | Walser | |
| 4,625,500 A | 12/1986 | Huber | |
| 4,635,542 A | 1/1987 | Sebelist et al. | |
| 4,689,938 A | 9/1987 | Zoppa | |
| 4,707,390 A | 11/1987 | Cheung | |
| 4,718,219 A | 1/1988 | Schmitz | |
| 4,718,522 A | 1/1988 | Frania et al. | |
| 4,776,905 A | 10/1988 | Cheung et al. | |
| 4,820,363 A | 4/1989 | Fischer | |
| 4,850,179 A | 7/1989 | Takami | |
| 4,901,775 A | 2/1990 | Scott et al. | |
| 4,934,261 A | 6/1990 | Niedrig | |
| 5,058,365 A | 10/1991 | Kagi | |
| 5,105,130 A | 4/1992 | Barker et al. | |
| 5,133,532 A | 7/1992 | Figiel et al. | |
| 5,141,591 A | 8/1992 | Boek et al. | |
| 5,146,847 A | 9/1992 | Lyon et al. | |
| 5,155,982 A | 10/1992 | Boek et al. | |
| 5,159,218 A | 10/1992 | Murry et al. | |
| 5,165,532 A | 11/1992 | Pipich et al. | |
| 5,175,925 A * | 1/1993 | Grosklos | H01R 43/0488 |
| | | | 72/441 |
| 5,379,576 A | 1/1995 | Koyama | |
| 5,467,701 A * | 11/1995 | Bartzick | B65B 13/22 |
| | | | 100/29 |
| 5,509,594 A | 4/1996 | Maggioni | |
| 5,513,482 A | 5/1996 | Nagashima et al. | |
| 5,516,022 A | 5/1996 | Annis | |
| 5,518,043 A | 5/1996 | Cheung et al. | |
| 5,632,851 A | 5/1997 | Young | |
| 5,653,095 A | 8/1997 | Stamm | |
| 5,689,943 A | 11/1997 | Wehr | |
| 5,690,023 A | 11/1997 | Stamm et al. | |
| 5,694,984 A | 12/1997 | Cheung | |
| 5,798,596 A | 8/1998 | Lordo | |
| 5,809,873 A | 9/1998 | Chak et al. | |
| 5,831,404 A | 11/1998 | Ishii | |
| 5,853,524 A | 12/1998 | Nix | |
| 5,881,855 A | 3/1999 | Putney et al. | |
| 5,894,789 A * | 4/1999 | Huber | B65B 13/22 |
| | | | 100/32 |
| 5,916,108 A | 6/1999 | Drietz et al. | |
| 5,942,061 A | 8/1999 | Figiel et al. | |
| 5,947,166 A | 9/1999 | Doyle et al. | |
| 5,954,899 A | 9/1999 | Figiel et al. | |
| 6,003,578 A | 12/1999 | Chang | |
| 6,041,581 A | 3/2000 | Huber | |
| 6,041,698 A | 3/2000 | Chin-Chang et al. | |
| 6,073,664 A | 6/2000 | Angarola | |
| 6,079,457 A | 6/2000 | Crittenden | |
| 6,109,325 A | 8/2000 | Chang | |
| 6,131,634 A | 10/2000 | Chang | |
| 6,173,747 B1 | 1/2001 | Angarola et al. | |
| 6,206,053 B1 | 3/2001 | Hillegonds | |
| 6,260,337 B1 | 7/2001 | Cheung | |
| 6,308,745 B1 | 10/2001 | Angarola et al. | |
| 6,308,760 B1 | 10/2001 | Finzo et al. | |
| 6,328,087 B1 | 12/2001 | Finzo et al. | |
| 6,332,306 B1 | 12/2001 | Finzo et al. | |
| 6,332,386 B1 | 12/2001 | Popp | |
| 6,338,375 B1 | 1/2002 | Harada | |
| 6,345,658 B1 | 2/2002 | Shida et al. | |
| 6,405,766 B1 | 6/2002 | Benjey | |
| 6,405,776 B1 | 6/2002 | Rauch | |
| 6,415,712 B1 | 7/2002 | Helland et al. | |
| 6,422,272 B1 | 7/2002 | Crittenden | |
| 6,463,847 B1 | 10/2002 | Rauch | |
| 6,470,941 B1 | 10/2002 | Wehr | |
| 6,516,715 B1 | 2/2003 | Reiche | |
| 6,533,013 B1 | 3/2003 | Nix | |
| 6,554,030 B2 | 4/2003 | Cheung et al. | |
| 6,568,158 B2 | 5/2003 | Shibazaki et al. | |
| 6,578,337 B2 | 6/2003 | Scholl et al. | |
| 6,584,891 B1 | 7/2003 | Smith et al. | |
| 6,606,766 B2 | 8/2003 | Ko | |
| 6,640,838 B2 | 11/2003 | Finzo | |
| 6,644,713 B2 | 11/2003 | Del Pozo Abejon et al. | |
| 6,698,460 B2 | 3/2004 | Marsche | |
| 6,715,375 B2 | 4/2004 | Nestler | |
| 6,729,357 B2 | 5/2004 | Marsche | |
| 6,732,638 B1 | 5/2004 | Rometty et al. | |
| 6,772,798 B2 | 8/2004 | Cheung | |
| 6,817,159 B2 | 11/2004 | Sakaki et al. | |
| 6,895,733 B2 | 5/2005 | Nix | |
| 6,907,717 B2 | 6/2005 | Nix | |
| 6,911,799 B2 | 6/2005 | Jensen | |

(56) References Cited

U.S. PATENT DOCUMENTS

| | | |
|---|---|---|
| 6,918,235 B2 | 7/2005 | Nix |
| 6,957,678 B2 | 10/2005 | Scholl et al. |
| 6,966,255 B1 | 11/2005 | Crittenden |
| 7,011,000 B2 | 3/2006 | Kushida et al. |
| 7,017,323 B2 | 3/2006 | Sobel |
| 7,073,431 B1 | 7/2006 | Chen |
| 7,081,612 B1 | 7/2006 | Lu |
| 7,082,872 B2 | 8/2006 | Goodley |
| 7,089,970 B2 | 8/2006 | Bernard |
| 7,128,099 B2 | 10/2006 | Finzo |
| 7,155,885 B1 | 1/2007 | Nasiatka et al. |
| 7,157,882 B2 | 1/2007 | Johnson et al. |
| 7,204,187 B2 | 4/2007 | Zeimetz et al. |
| 7,236,243 B2 | 6/2007 | Beecroft et al. |
| 7,249,862 B2 | 7/2007 | Shirane |
| 7,312,609 B2 | 12/2007 | Schmollngruber et al. |
| 7,318,305 B2 | 1/2008 | Reiche |
| 7,350,543 B2 | 4/2008 | Crittenden |
| 7,377,213 B1 | 5/2008 | Haberstroh et al. |
| 7,428,866 B2 | 9/2008 | Reiche |
| 7,455,080 B2 | 11/2008 | Crittenden et al. |
| 7,456,608 B2 | 11/2008 | Kageler et al. |
| 7,497,068 B2 | 3/2009 | Nasiatka et al. |
| 7,556,129 B2 | 7/2009 | Nix |
| 7,562,620 B1 | 7/2009 | Nasiatka et al. |
| 7,637,208 B2 | 12/2009 | Reiche et al. |
| 7,669,526 B2 | 3/2010 | Fay |
| 7,703,330 B2 | 4/2010 | Miyazaki et al. |
| D629,321 S | 12/2010 | Neeser et al. |
| 7,857,560 B2 | 12/2010 | Leggett et al. |
| 7,948,336 B2 | 5/2011 | Park |
| D651,498 S | 1/2012 | Neeser et al. |
| D653,923 S | 2/2012 | Neeser et al. |
| 8,174,713 B2 | 5/2012 | Yanagi et al. |
| 8,198,839 B2 | 6/2012 | Katou et al. |
| 8,281,711 B2 | 10/2012 | Haberstroh et al. |
| 8,287,672 B2 | 10/2012 | Neeser et al. |
| 8,356,641 B2 | 1/2013 | Marelin et al. |
| 8,378,600 B2 | 2/2013 | Katou et al. |
| 8,387,523 B2 | 3/2013 | Yang |
| 8,567,310 B2 | 10/2013 | Yi |
| 8,967,217 B2 | 3/2015 | Gardner et al. |
| 9,085,070 B2 | 7/2015 | Skonieczny et al. |
| 9,132,928 B2 | 9/2015 | Rooth |
| 9,174,752 B2 | 11/2015 | Neeser et al. |
| 9,192,979 B2 | 11/2015 | Itagaki |
| 9,193,486 B2 | 11/2015 | Neeser et al. |
| 9,233,457 B2 | 1/2016 | Wanek et al. |
| 9,248,553 B2 | 2/2016 | Schurder et al. |
| 9,254,932 B2 | 2/2016 | Neeser et al. |
| 9,272,799 B2 | 3/2016 | Figiel et al. |
| 9,284,080 B2 | 3/2016 | Neeser et al. |
| 9,315,283 B2 | 4/2016 | Neeser et al. |
| 9,346,572 B2 | 5/2016 | Leppert |
| 9,387,573 B2 | 7/2016 | Pearson |
| 9,403,609 B2 | 8/2016 | Bonifazi et al. |
| 9,468,968 B2 | 10/2016 | Figiel et al. |
| 9,487,314 B2 | 11/2016 | Finzo |
| 9,586,708 B2 | 3/2017 | Finzo |
| 9,630,730 B2 | 4/2017 | Leppert |
| 9,789,984 B2 | 10/2017 | Sikora et al. |
| 9,932,135 B2 | 4/2018 | Finzo et al. |
| 9,938,029 B2 | 4/2018 | Finzo et al. |
| 9,994,341 B2 | 6/2018 | Amacker et al. |
| 10,058,989 B2 | 8/2018 | Chellew |
| 10,227,149 B2 | 3/2019 | Keller |
| 10,308,383 B2 | 6/2019 | Boss et al. |
| 10,336,002 B2 | 7/2019 | Barlasov |
| 10,370,132 B2 | 8/2019 | Finzo et al. |
| 10,464,699 B2 | 11/2019 | Figiel et al. |
| 10,518,914 B2 | 12/2019 | Neeser et al. |
| 10,577,137 B2 | 3/2020 | Nasiatka et al. |
| 10,604,286 B2 | 3/2020 | Nelson |
| 10,640,244 B2 | 5/2020 | Widmer et al. |
| 10,745,158 B2 | 8/2020 | Sikora et al. |
| 10,773,841 B2 | 9/2020 | Skonieczny |
| 10,882,649 B2 | 1/2021 | Rauch |
| 11,008,125 B2 | 5/2021 | Kruzel |
| 11,053,034 B1 | 7/2021 | Sikora et al. |
| D928,577 S | 8/2021 | Hochstrasser |
| 11,084,609 B2 | 8/2021 | Hochstrasser et al. |
| 11,084,610 B2 | 8/2021 | Boss et al. |
| 11,097,863 B2 | 8/2021 | Figiel et al. |
| 11,104,460 B2 | 8/2021 | Neeser et al. |
| 11,123,788 B2 | 9/2021 | Kasahara et al. |
| 11,130,598 B2 | 9/2021 | Sikora et al. |
| 11,155,375 B2 | 10/2021 | Keller et al. |
| 11,162,269 B2 | 11/2021 | Machida et al. |
| 11,174,051 B2 | 11/2021 | Graef et al. |
| 11,247,791 B2 | 2/2022 | He et al. |
| 11,247,792 B2 | 2/2022 | Mellas et al. |
| 11,267,596 B2 | 3/2022 | Finzo et al. |
| 11,377,241 B2 | 7/2022 | Finzo |
| 11,414,225 B2 | 8/2022 | Brettschneider et al. |
| 11,459,778 B2 | 10/2022 | Nagaoka et al. |
| 11,472,583 B2 | 10/2022 | Finzo |
| 11,473,322 B2 | 10/2022 | Coles et al. |
| D969,883 S | 11/2022 | Hüssy |
| 11,485,528 B2 | 11/2022 | Dohrmann et al. |
| 11,492,157 B2 | 11/2022 | Hochstrasser et al. |
| 11,511,893 B2 | 11/2022 | Sikora et al. |
| 11,524,801 B2 | 12/2022 | Keller et al. |
| 11,530,059 B2 | 12/2022 | Neeser et al. |
| 11,560,245 B2 | 1/2023 | Finzo et al. |
| 11,560,246 B2 | 1/2023 | Neeser et al. |
| 11,560,247 B2 | 1/2023 | Sikora et al. |
| 11,571,733 B2 | 2/2023 | Yoshida et al. |
| 11,577,866 B2 | 2/2023 | Nasiatka et al. |
| 11,597,547 B2 | 3/2023 | Finzo |
| 11,667,417 B2 | 6/2023 | Fizno et al. |
| 11,667,418 B2 | 6/2023 | Neeser et al. |
| 11,731,794 B2 | 8/2023 | Neeser et al. |
| 11,760,515 B2 | 9/2023 | Finzo et al. |
| 11,932,430 B2 | 3/2024 | Finzo et al. |
| 11,981,464 B2 | 5/2024 | Sikora et al. |
| 2002/0100146 A1 | 8/2002 | Ko |
| 2002/0129717 A1 | 9/2002 | Helland et al. |
| 2002/0134811 A1 | 9/2002 | Napier et al. |
| 2002/0179174 A1 | 12/2002 | Marsche |
| 2002/0179175 A1 | 12/2002 | Finzo |
| 2003/0056337 A1 | 3/2003 | Scholl et al. |
| 2003/0121611 A1 | 7/2003 | Scholl et al. |
| 2003/0131570 A1 | 7/2003 | Scholl et al. |
| 2003/0145900 A1 | 8/2003 | Jensen et al. |
| 2003/0221566 A1 | 12/2003 | Apel et al. |
| 2004/0050188 A1 | 3/2004 | Richards et al. |
| 2004/0206251 A1 | 10/2004 | Nix |
| 2004/0231289 A1 | 11/2004 | Reiche |
| 2004/0237467 A1 | 12/2004 | Sobel |
| 2005/0000586 A1 | 1/2005 | Zeimetz et al. |
| 2005/0279198 A1 | 12/2005 | Kushida et al. |
| 2006/0108180 A1 | 5/2006 | Grach et al. |
| 2006/0114498 A1 | 6/2006 | Yanagi et al. |
| 2006/0192527 A1 | 8/2006 | Kageler et al. |
| 2007/0227370 A1 | 10/2007 | Reiche |
| 2008/0196911 A1 | 8/2008 | Krapf et al. |
| 2008/0219745 A1 | 9/2008 | Bungert et al. |
| 2009/0013656 A1 | 1/2009 | Nasiatka et al. |
| 2009/0114308 A1 | 5/2009 | Marelin et al. |
| 2009/0266247 A1 | 10/2009 | Reiche et al. |
| 2010/0077810 A1 | 4/2010 | De Franceschi |
| 2010/0242419 A1 | 9/2010 | Dufeu et al. |
| 2011/0056389 A1 | 3/2011 | Neeser et al. |
| 2011/0056390 A1 | 3/2011 | Neeser et al. |
| 2011/0056391 A1 | 3/2011 | Neeser et al. |
| 2011/0056392 A1 | 3/2011 | Neeser et al. |
| 2011/0100233 A1 | 5/2011 | Neeser et al. |
| 2011/0253480 A1 | 10/2011 | Goodman et al. |
| 2012/0007748 A1 | 1/2012 | Forgues et al. |
| 2012/0017780 A1 | 1/2012 | Haberstroh et al. |
| 2012/0160364 A1 | 6/2012 | Katou et al. |
| 2012/0210682 A1 | 8/2012 | Gardner et al. |
| 2012/0299727 A1 | 11/2012 | Newman et al. |
| 2013/0092408 A1 | 4/2013 | Oberheim |

(56) References Cited

U.S. PATENT DOCUMENTS

| | | | |
|---|---|---|---|
| 2013/0186287 | A1 | 7/2013 | Vick et al. |
| 2014/0008090 | A1 | 1/2014 | Kokinelis et al. |
| 2014/0060345 | A1 | 3/2014 | Figiel et al. |
| 2014/0083311 | A1 | 3/2014 | Bonifazi et al. |
| 2014/0290179 | A1 | 10/2014 | Keller |
| 2014/0311363 | A1 | 10/2014 | Leppert |
| 2015/0033959 | A1 | 2/2015 | Finzo |
| 2015/0034206 | A1 | 2/2015 | Finzo |
| 2015/0210411 | A1 | 7/2015 | Finzo et al. |
| 2015/0246739 | A1 | 9/2015 | Finzo et al. |
| 2016/0046398 | A1 | 2/2016 | Neeser et al. |
| 2016/0068287 | A1 | 3/2016 | Gannon |
| 2016/0107775 | A1 | 4/2016 | Amacker et al. |
| 2016/0107776 | A1 | 4/2016 | Amacker et al. |
| 2016/0137323 | A1 | 5/2016 | Amacker |
| 2016/0159505 | A1 | 6/2016 | Widmer et al. |
| 2016/0376041 | A1 | 12/2016 | Skonieczny et al. |
| 2017/0008652 | A1 | 1/2017 | Figiel et al. |
| 2017/0152065 | A1 | 6/2017 | Ballard |
| 2017/0166335 | A1 | 6/2017 | Nasiatka et al. |
| 2017/0174374 | A1 | 6/2017 | Figiel et al. |
| 2018/0054033 | A1 | 2/2018 | Skonieczny et al. |
| 2018/0250805 | A1 | 9/2018 | Takidis et al. |
| 2019/0168900 | A1 | 6/2019 | Keller |
| 2020/0156224 | A1 | 5/2020 | Suenaga |
| 2020/0262591 | A1 | 8/2020 | Graef et al. |
| 2020/0339289 | A1 | 10/2020 | Finzo |
| 2020/0339290 | A1 | 10/2020 | Finzo |
| 2020/0369415 | A1 | 11/2020 | Skonieczny |
| 2020/0377245 | A1 | 12/2020 | Sikora et al. |
| 2021/0016907 | A1 | 1/2021 | Sikora et al. |
| 2021/0221543 | A1 | 7/2021 | Finzo |
| 2021/0309400 | A1 | 10/2021 | Yu |
| 2021/0371142 | A1 | 12/2021 | Figiel et al. |
| 2022/0009659 | A1 | 1/2022 | Sikora et al. |
| 2022/0048656 | A1 | 2/2022 | Graef et al. |
| 2022/0063850 | A1 | 3/2022 | Keller et al. |
| 2022/0119140 | A1 | 4/2022 | Sikora et al. |
| 2022/0144463 | A1 | 5/2022 | Finzo et al. |
| 2022/0227508 | A1 | 7/2022 | Jang et al. |
| 2022/0227509 | A1 | 7/2022 | Jang et al. |
| 2022/0267038 | A1 | 8/2022 | Hattori et al. |
| 2022/0297861 | A1 | 9/2022 | Diederiks et al. |

FOREIGN PATENT DOCUMENTS

| | | | |
|---|---|---|---|
| BE | 893127 | A | 8/1982 |
| BE | 893128 | A | 8/1982 |
| CA | 499861 | A | 2/1954 |
| CA | 2432353 | A1 | 12/2003 |
| CA | 2543819 | C | 12/2003 |
| CH | 303489 | A | 11/1954 |
| CH | 372241 | A | 9/1963 |
| CH | 378223 | A | 5/1964 |
| CH | 705743 | A2 | 5/2013 |
| CH | 705744 | A2 | 5/2013 |
| CH | 705745 | A2 | 5/2013 |
| CH | 708328 | A2 | 12/2014 |
| CH | 708330 | A2 | 12/2014 |
| CH | 708331 | A2 | 12/2014 |
| CH | 708332 | A2 | 12/2014 |
| CH | 709244 | A2 | 8/2015 |
| CH | 709245 | A2 | 8/2015 |
| CH | 709246 | A2 | 8/2015 |
| CN | 1055426 | C | 10/1991 |
| CN | 2266566 | Y | 11/1997 |
| CN | 2346694 | Y | 11/1999 |
| CN | 1253098 | A | 5/2000 |
| CN | 1297270 | A | 5/2001 |
| CN | 1386675 | A | 12/2002 |
| CN | 1386676 | A | 12/2002 |
| CN | 1660675 | A | 8/2005 |
| CN | 101164416 | A | 4/2008 |
| CN | 101267988 | A | 9/2008 |
| CN | 100460284 | C | 2/2009 |
| CN | 101422761 | A | 5/2009 |
| CN | 101486329 | A | 7/2009 |
| CN | 101585244 | A | 11/2009 |
| CN | 201411059 | Y | 2/2010 |
| CN | 101870367 | A | 10/2010 |
| CN | 201957492 | U | 9/2011 |
| CN | 202100012 | U | 1/2012 |
| CN | 105358432 | A | 2/2016 |
| CN | 209258454 | U | 8/2019 |
| CN | 209258455 | U | 8/2019 |
| CN | 209258456 | U | 8/2019 |
| CN | 209258457 | U | 8/2019 |
| CN | 209258462 | U | 8/2019 |
| CN | 209366535 | U | 9/2019 |
| CN | 209366545 | U | 9/2019 |
| CN | 209410408 | U | 9/2019 |
| CN | 209410410 | U | 9/2019 |
| CN | 111762397 | A | 10/2020 |
| CN | 111776283 | A | 10/2020 |
| CN | 111776284 | A | 10/2020 |
| CN | 111776285 | A | 10/2020 |
| CN | 212401669 | U | 1/2021 |
| CN | 212401670 | U | 1/2021 |
| CN | 212474062 | U | 2/2021 |
| CN | 212606304 | U | 2/2021 |
| CN | 212767210 | U | 3/2021 |
| CN | 214002141 | U | 8/2021 |
| CN | 214566362 | U | 11/2021 |
| CN | 114013712 | A | 2/2022 |
| CN | 114148567 | A | 3/2022 |
| CN | 114229081 | A | 3/2022 |
| CN | 114229082 | A | 3/2022 |
| CN | 114261562 | A | 4/2022 |
| CN | 216301573 | U | 4/2022 |
| CN | 216301575 | U | 4/2022 |
| CN | 114476180 | A | 5/2022 |
| CN | 216468689 | U | 5/2022 |
| CN | 216611733 | U | 5/2022 |
| CN | 114572447 | A | 6/2022 |
| CN | 216734903 | U | 6/2022 |
| CN | 216834406 | U | 6/2022 |
| CN | 216834408 | U | 6/2022 |
| CN | 216834409 | U | 6/2022 |
| CN | 216916412 | U | 7/2022 |
| CN | 217100581 | U | 8/2022 |
| CN | 217375001 | U | 9/2022 |
| CN | 217375005 | U | 9/2022 |
| CN | 218641139 | U | 3/2023 |
| CN | 116692100 | A | 9/2023 |
| DE | 675534 | C1 | 5/1939 |
| DE | 709965 | C1 | 8/1941 |
| DE | 811815 | C1 | 8/1951 |
| DE | 822677 | C1 | 11/1951 |
| DE | 822678 | C1 | 11/1951 |
| DE | 829271 | C1 | 1/1952 |
| DE | 893772 | C1 | 10/1953 |
| DE | 936257 | C1 | 12/1955 |
| DE | 936496 | C1 | 12/1955 |
| DE | 937515 | C | 1/1956 |
| DE | 947239 | C1 | 8/1956 |
| DE | 10 08 644 | B | 5/1957 |
| DE | 10 65 321 | B | 9/1959 |
| DE | 11 12 448 | B | 8/1961 |
| DE | 11 40 858 | B | 12/1962 |
| DE | 18 93 046 | U | 5/1964 |
| DE | 11 73 017 | B | 6/1964 |
| DE | 11 85 532 | B | 1/1965 |
| DE | 12 11 102 | B | 2/1966 |
| DE | 12 15 577 | B | 4/1966 |
| DE | 19 73 947 | U | 11/1967 |
| DE | 12 78 337 | B | 9/1968 |
| DE | 15 11 982 | A1 | 11/1969 |
| DE | 15 86 001 | A1 | 4/1970 |
| DE | 15 86 002 | A1 | 4/1970 |
| DE | 15 86 553 | A1 | 6/1970 |
| DE | 15 86 549 | A1 | 8/1970 |
| DE | 15 86 550 | A1 | 8/1970 |
| DE | 18 06 370 | B2 | 1/1971 |
| DE | 23 35 805 | A1 | 2/1974 |

(56) References Cited

FOREIGN PATENT DOCUMENTS

| | | |
|---|---|---|
| DE | 22 49 500 A1 | 4/1974 |
| DE | 22 49 522 A1 | 4/1974 |
| DE | 23 02 912 A1 | 7/1974 |
| DE | 24 31 153 A1 | 1/1976 |
| DE | 24 43 642 A1 | 3/1976 |
| DE | 21 02 344 C3 | 5/1977 |
| DE | 26 41 889 A1 | 3/1978 |
| DE | 27 23 312 A1 | 12/1978 |
| DE | 27 31 165 A1 | 1/1979 |
| DE | 27 35 511 A1 | 2/1979 |
| DE | 32 29 870 A1 | 2/1984 |
| DE | 198516414 U1 | 9/1985 |
| DE | 36 09 354 A1 | 10/1986 |
| DE | 35 25 647 A1 | 1/1987 |
| DE | 198113906 U1 | 1/1988 |
| DE | 198113907 U1 | 2/1988 |
| DE | 198129880 U1 | 4/1988 |
| DE | 38 20 060 A1 | 12/1989 |
| DE | 199000418 U1 | 1/1990 |
| DE | 40 14 305 A1 | 11/1991 |
| DE | 42 04 420 A1 | 8/1993 |
| DE | 199306786 U1 | 8/1993 |
| DE | 199311406 U1 | 11/1993 |
| DE | 199319249 U1 | 2/1994 |
| DE | 29517428 U1 | 2/1996 |
| DE | 29722491 U1 | 4/1998 |
| DE | 19751861 A1 | 1/1999 |
| DE | 19816970 A1 | 10/1999 |
| DE | 10026200 A1 | 11/2001 |
| DE | 10134255 B4 | 2/2003 |
| DE | 19823400 B4 | 7/2004 |
| DE | 10 2004 012 732 B3 | 12/2004 |
| DE | 20 2005 007 849 U1 | 9/2005 |
| DE | 10 2005 049 130 A1 | 4/2007 |
| DE | 10 2006 007 990 A1 | 8/2007 |
| DE | 10 2010 016 774 B4 | 11/2011 |
| DE | 20 2011 050 797 U1 | 11/2011 |
| DE | 20 2016 102 880 U1 | 9/2017 |
| DK | 199200100 U4 | 11/1992 |
| EP | 0 769 08 B1 | 4/1983 |
| EP | 0 956 43 A2 | 12/1983 |
| EP | 0 279 871 A1 | 8/1988 |
| EP | 0 465 772 B1 | 1/1992 |
| EP | 0 603 868 A1 | 6/1994 |
| EP | 0 659 525 A2 | 6/1995 |
| EP | 0 662 438 A1 | 7/1995 |
| EP | 0 664 256 A1 | 7/1995 |
| EP | 0 744 343 A1 | 11/1996 |
| EP | 0 730 920 B1 | 11/2001 |
| EP | 1 177 978 A1 | 2/2002 |
| EP | 1 260 441 A1 | 11/2002 |
| EP | 1 413 519 B | 3/2007 |
| EP | 2 206 650 A1 | 7/2010 |
| EP | 2 271 553 A1 | 1/2011 |
| EP | 2 711 301 B1 | 3/2014 |
| EP | 2 865 601 A1 | 4/2015 |
| EP | 2 897 866 A1 | 7/2015 |
| EP | 3 272 659 | 1/2018 |
| EP | 3 696 103 A | 8/2020 |
| EP | 3 892 552 B1 | 10/2021 |
| EP | 4 316 995 A1 | 2/2024 |
| FI | 47064 C | 9/1973 |
| FI | 47065 C | 9/1973 |
| FI | 47066 C | 9/1973 |
| FI | 47469 C | 12/1973 |
| FI | 47555 C | 1/1974 |
| FR | 1114726 A | 4/1956 |
| FR | 1287960 A | 3/1962 |
| FR | 1308538 A | 11/1962 |
| GB | 0 405 753 A | 2/1934 |
| GB | 0 713 474 A | 8/1954 |
| GB | 0 785 407 A | 10/1957 |
| GB | 0 956 978 A | 4/1964 |
| GB | 1 048 598 A | 11/1966 |
| GB | 1 161 827 A | 8/1969 |
| GB | 2 041 869 A | 9/1980 |
| GB | 1 984 01818 | 2/1984 |
| GB | 2 088 466 B | 8/1984 |
| GB | 2 098 163 | 9/1985 |
| GB | 2 144 075 B | 11/1986 |
| GB | 2 185 228 A | 7/1987 |
| GB | 2 185 229 A | 7/1987 |
| GB | 2 144 092 B | 5/1988 |
| GB | 2 179 623 B | 5/1988 |
| GB | 2 191 987 B | 5/1988 |
| GB | 2 481 724 A | 1/2012 |
| ID | 501009 A | 4/2010 |
| IT | 2019000006286 B1 | 3/2021 |
| IT | 2019000006288 B1 | 3/2021 |
| IT | 2020000027110 B1 | 12/2022 |
| IT | 202200002321 A1 | 8/2023 |
| JP | 54-001238 B | 1/1979 |
| JP | 56-038220 A | 4/1981 |
| JP | 57-027852 A | 2/1982 |
| JP | S646555 A | 1/1989 |
| JP | 03-054566 U | 3/1991 |
| JP | 07-300108 A | 11/1995 |
| JP | 08-258808 A | 10/1996 |
| JP | 09-283103 A | 10/1997 |
| JP | H1110259 A | 1/1999 |
| JP | 3044132 B2 | 5/2000 |
| JP | 2003-231291 A | 8/2003 |
| JP | 2003-534989 A | 11/2003 |
| JP | 2003-348899 A | 12/2003 |
| JP | 2004-018117 A | 1/2004 |
| JP | 2004-108593 A | 4/2004 |
| JP | 2004-241150 A | 8/2004 |
| JP | 2011-518085 A | 6/2011 |
| JP | 2011-518088 A | 6/2011 |
| KR | 20020013056 A | 2/2002 |
| KR | 100346511 B1 | 7/2002 |
| KR | 100943256 B1 | 2/2010 |
| KR | 101613251 B1 | 4/2016 |
| MY | 2008PI000630 | 3/2008 |
| RU | 1772784 C | 10/1992 |
| RU | 2161773 C2 | 1/2001 |
| RU | 2355821 C1 | 5/2009 |
| SE | 356270 B | 5/1973 |
| SE | 373328 B | 2/1975 |
| SE | 389320 B | 11/1976 |
| SE | 395873 B | 8/1977 |
| SE | 464630 B | 5/1991 |
| TW | I276571 B | 3/2007 |
| WO | WO-84/00023 A1 | 1/1984 |
| WO | WO-95/13966 A1 | 5/1995 |
| WO | WO-00/03864 A1 | 1/2000 |
| WO | WO-00/56606 A1 | 9/2000 |
| WO | WO-01/89929 A1 | 11/2001 |
| WO | WO-2006/048738 A1 | 5/2006 |
| WO | WO-2007/033775 A1 | 3/2007 |
| WO | WO-2008/128661 A1 | 10/2008 |
| WO | WO-2009/062612 A2 | 5/2009 |
| WO | WO-2009/114717 A2 | 9/2009 |
| WO | WO-2009/129633 A1 | 10/2009 |
| WO | WO-2009/129634 A1 | 10/2009 |
| WO | WO-2009/129636 A1 | 10/2009 |
| WO | WO-2010/029451 A1 | 3/2010 |
| WO | WO-2013/091869 A1 | 6/2013 |
| WO | WO-2013/181772 A1 | 12/2013 |
| WO | WO-2014/072775 A1 | 5/2014 |
| WO | WO-2014/167377 A1 | 10/2014 |
| WO | WO-2014/194434 A1 | 12/2014 |
| WO | WO-2015/089538 A1 | 6/2015 |
| WO | WO-2015/089539 A1 | 6/2015 |
| WO | WO-2015/1089539 | 6/2015 |
| WO | WO-2015/162171 A1 | 10/2015 |
| WO | WO-2022/015566 A2 | 1/2022 |
| WO | WO-2023/004232 | 1/2023 |
| WO | WO-2024/003765 A1 | 1/2024 |

(56) References Cited

FOREIGN PATENT DOCUMENTS

| WO | WO-2024/003772 A1 | 1/2024 |
|----|-------------------|--------|
| WO | WO-2024/003852 A1 | 1/2024 |

OTHER PUBLICATIONS

Cyklop International—CB 130 "CB 130 Battery/Friction Weld Handtool" Product publication released by Cyklop (Accessed via Wayback Machine: https://web.archive.org/web/20080607044652/http://cyklop.co.uk:80/product.asp?id=141) Accessed Mar. 28, 2024 (2 pages).
Cyklop International—CB 130 "Handapparat / Hand Tool CB 130" Operating Instructions and Operating Sequence, dated Apr. 2004. (26 pages).
Cyklop International—CB 130 "Handapparat / Hand Tool CB 130" Operating Instructions, dated Apr. 2004. (22 pages).
Cyklop International—CB 130 "The Cyklop CB 130, The new dimension in single-handed strapping" Product Brochure, dated Jan. 4, 2003 (2 pages).
Cyklop International—CB 130 Operating Sequence, dated Sep. 2003. (4 pages).
Cyklop International—CB-130 "CB130 Battery Powered Friction Weld Tool" Brochure, Published by Cyklop May 2006 (1 page).
Cyklop International—CB-130 "Friction Weld-Battery Powered—CB 130" Manual and Spare Parts List, Sep. 2005 (9 pages).
Cyklop International—CH 47 "Strapping Hand Tool CH 47" Product Brochure, document created Oct. 25, 2002 (2 pages).
Cyklop International—CL 100 "The Cyklop CL 100, The innovation in load strapping" Product Brochure, dated 2003 (2 pages).
Cyklop International—CMT 250/CHT 400 "Cyklop CMT 250 / CHT 400 for medium-weight and heavy packages" Brochure Published by Cyklop 2009 (2 pages).
Cyklop International—CMT 250/CHT 400 "Plastic Strapping Hand Tool Model Series: CMT 250 / CHT 400" Brochure Published by Cyklop Mar. 2012(2 pages).
Cyklop International—CP 98 "Pneumatic Strapping Tool CP 98" Product Brochure, document created Jan. 3, 2003 (2 pages).
Cyklop International—CR 19 "CR 19 Battery-Driven Steel Strapping Tool" Product Brochure, dated 2024 (2 pages).
Emandi—"Brushless DC Motor Drives" Energy-Efficient Electrical Motors, 3rd ed., Aug. 2004, 1. 270-272, CRC Press & Marcel Dekker (4 pages).
Fromm Operations Manual/Spare Parts List for Battery-Powered Plastic Strapping Tool Model P320, 43.0562.04, dated Apr. 2005 (20 pages).
Fromm Service Manual, "Battery-Powered Plastic Strapping Tool Model P324.0001.01" dated Dec. 2008 (54 pages).
Fromm Service Manual, "Battery-Powered Plastic Strapping Tool Model P325.0001.01" dated Dec. 2008 (52 pages).
Fromm Service Manual, "Battery-Powered Plastic Strapping Tool Model P328 M/HA / P328 A/A" dated Feb. 2016 (47 pages).
Fromm Service Manual, "Battery-Powered Plastic Strapping Tool Model P331 M/HA / P331 A/A" dated Jun. 2016 (48 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A01—U.S. Patent Application Pub. No. US 2011/0056391 A1 ("Neeser") vs. Asserted Claims of U.S. Pat. No. 11,667,417 (97 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A02—U.S. Pat. No. 5,653,095 ("Stamm") vs. Asserted Claims of U.S. Pat. No. 11,667,417 (57 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A03—U.S. Patent Application Pub. No. US 2012/0210682A1 ("Gardner") vs. Asserted Claims of U.S. Pat. No. 11,667,417 (65 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A04—U.S. Pat. No. 4,313,779 ("Nix") vs. Asserted Claims of U.S. Pat. No. 11,667,417 (55 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A05—U.S. Pat. No. 3,032,075 ("Hall") vs. Asserted Claims of U.S. Pat. No. 11,667,417 (44 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A06—U.S. Pat. No. 6,578,337 ("Scholl") vs. Asserted Claims of U.S. Pat. No. 11,667,417 (51 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A07—U.S. Pat. No. 6,328,087 ("Finzo") vs. Asserted Claims of U.S. Pat. No. 11,667,417 (63 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A08—U.S. Pat. No. 7,073,431 ("Chen") vs. Asserted Claims of U.S. Pat. No. 11,667,417 (52 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A09—U.S. Pat. No. 9,403,609 ("Bonifazi") vs. Asserted Claims of U.S. Pat. No. 11,667,417 (63 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A10—U.S. Pat. No. 6,895,733 ("Nix (733)") vs. Asserted Claims of U.S. Pat. No. 11,667,417 (40 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A11—for U.S. Patent Application Pub. No. US2016/0107775 ("Amacker") vs. Asserted Claims of U.S. Pat. No. 11,667,417 (105 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A12—U.S. Pat. No. 4,488,926 ("Rauch") vs. Asserted Claims of U.S. Pat. No. 11,667,417 (49 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A13—Cyklop CB 130 ("CB 130") vs. Asserted Claims of U.S. Pat. No. 11,667,417 (63 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A14—U.S. Patent Application Pub. No. US 2011/0056392 A1 ("Neeser II") vs. Asserted Claims of U.S. Pat. No. 11,667,417 (77 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit A15—Secondary References to be Used in Combination With Other References for U.S. Pat. No. 2,936,156 ("Coupland") European Patent EP1008520B1 ("Harada") U.S. Pat. No. 4,015,643 ("Cheung") vs. Asserted Claims of U.S. Pat. No. 11,667,417 (43 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit B01 - U.S. Pat. No. 6,328,087 ("Finzo 087") vs. Asserted Claims of the '418 Patent (243 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit B02—"Fromm Operation Manual / Spare Parts List Battery-Powered Plastic Strapping Tool Model P331 M/HA" ("Fromm P331 Manual") vs. Asserted Claims of the '418 Patent (118 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit B03—U.S. Pat. No. 5,653,095 ("Stamm") vs. Asserted Claims of the '418 Patent (243 pages).
Invalidity Contentions served on Jul. 10, 2024 in *Signode Industrial Group LLC* v. *Samuel, Son & Co., Ltd. et al* (E.D. Tex. 2:24-cv-00080-JRG) Exhibit B04—U.S. Patent App. Pub. No. 2015/0246739 ("Finzo 739") vs. Asserted Claims of the '418 Patent (356 pages).
Invalidity Contentions served on Jul. 10, 2024 in *Signode Industrial Group LLC* v. *Samuel, Son & Co., Ltd. et al* (E.D. Tex. 2:24-cv-

(56) References Cited

OTHER PUBLICATIONS

00080-JRG) Exhibit B05—U.S. Pat. No. 2,986,376 ("Falck-Pedersen") vs. Asserted Claims of the '418 Patent (174 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B06—U.S. Pat. No. 7,089,970 ("Bernard") vs. Asserted Claims of the '418 Patent (117 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B07—U.S. Pat. No. 3,586,572 ("Ericsson") vs. Asserted Claims of the '418 Patent (226 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B08—U.S. Pat. No. 3,718,526 ("Annis") vs. Asserted Claims of the '418 Patent (212 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B09—Fromm P331 Device/\1 ("Fromm P331 Device") vs. Asserted Claims of the '418 Patent (226 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B10—U.S. Pat. No. 9,403,609 ("Bonifazi") vs. Asserted Claims of the '418 Patent (245 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B11—SIAT GT One User's Manual / SIAT GT One Device ("SIAT GT One")/\1 vs. Asserted Claims of the '418 Patent (78 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B12—U.S. Pat. No. 9,346,572 ("Leppert") vs. Asserted Claims of the '418 Patent (154 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B13—U.S. Pat. No. 10,308,383 ("Boss") vs. Asserted Claims of the '418 Patent (102 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B14—U.S. Patent App. Pub. No. 2012/0210682 ("Gardner") vs. Asserted Claims of the '418 Patent (100 pages).
Invalidity Contentions served on Jul. 10, 2024 in *Signode Industrial Group LLC v. Samuel, Son & Co., Ltd. et al* (E.D. Tex. 2:24-cv-00080-JRG) Exhibit B15—Fromm P328 Manual and Fromm P328 Device/\1 ("Fromm P328") vs. Asserted Claims of the '418 Patent (135 pages).
Invalidity Contentions served on Jul. 24, 2024 in *Signode Industrial Group LLC v. Samuel, Son & Co., Ltd. et al* (E.D. Tex. 2:24-cv-00080-JRG)—"Defendants' Initial Invalidity Contentions—U.S. Pat. No. 11,932,430" (52 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C01 U.S. Pat. No. 5,653,095 ("Stamm") vs. Asserted Claims of U.S. Pat. No. 11,932,430 (48 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C02 U.S. Patent Application Pub. No. US 2011/0056391 A1 ("Neeser") vs. Asserted Claims of U.S. Pat. No. 11,932,430 (80 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C03 U.S. Patent Application Pub. No. US 2012/0210682A1 ("Gardner") vs. Asserted Claims of U.S. Pat. No. 11,932,430 (55 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C04 U.S. Pat. No. 4,313,779 ("Nix") vs. Asserted Claims of U.S. Pat. No. 11,932,430 (49 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C05 U.S. Pat. No. 3,032,075 (Hall) vs. Asserted Claims of U.S. Pat. No. 11,932,430 (49 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C06 U.S. Pat. No. 6,578,337 ("Scholl") vs. Asserted Claims of U.S. Pat. No. 11,932,430 (48 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C07 U.S. Pat. No. 6,328,087 ("Finzo") vs. Asserted Claims of U.S. Pat. No. 11,932,430 (51 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C08 U.S. Pat. No. 7,073,431 ("Chen") vs. Asserted Claims of U.S. Pat. No. 11,932,430 (44 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C09 U.S. Pat. No. 9,403,609 ("Bonifazi") vs. Asserted Claims of U.S. Pat. No. 11,932,430 (60 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C10 U.S. Pat. No. 6,895,733 ("Nix (733)") vs. Asserted Claims of U.S. Pat. No. 11,932,430 (34 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C11 U.S. Patent Application Pub. No. US2016/0107775 ("Amacker") vs. Asserted Claims of U.S. Pat. No. 11,932,430 (82 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C12 U.S. Pat. No. 4,488,926 ("Rauch") vs. Asserted Claims of U.S. Pat. No. 11,932,430 (40 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C13 Cyklop CB 130 ("CB 130") vs. Asserted Claims of U.S. Pat. No. 11,932,430 (72 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C14 U.S. Patent Application Pub. No. US 2011/0056392 A1 ("Neeser II") vs. Asserted Claims of U.S. Pat. No. 11,932,430 (67 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C15 U.S. Pat. No. 9,346,572 ("Leppert") vs. Asserted Claims of U.S. Pat. No. 11,932,430 (35 pages).
Invalidity Contentions served on Jul. 24, 2024 in *Signode Industrial Group LLC v. Samuel, Son & Co., Ltd. et al* (E.D. Tex. 2:24-cv-00080-JRG)—Exhibit C16 Secondary References to be Used in Combination With Other References U.S. Pat. No. 2,936,156 ("Coupland") European Patent EP1008520B1 ("Harada") U.S. Pat. No. 4,015,643 ("Cheung") U.S. Pat. No. 3,028,885 ("Leslie") U.S. Pat. No. 3,284,049 ("Haraden") U.S. Pat. No. 3,586,572 ("Ericsson") U.S. Pat. No. 3,718,526 ("Annis") vs. Assert.
Notice of Reasons for Refusal on JP Patent Application No. 2019/513774, dated Feb. 25, 2020 (15 pages).
Orgapack—OR-T 200 Operating Manual and Spare Parts List "Battery-hand tool for plastic strapping," Dec. 2008 (53 pages).
Orgapack—OR-T 250 Operating Manual "Battery-hand tool for plastic strapping," Distributed by Kraft, Jul. 2009 (36 pages).
Orgapack—OR-T 250 Operating Manual and Spare Parts List "Battery-hand tool for plastic strapping," Jul. 2015 (34 pages).
Orgapack—OR-T 400 Operating Manual "Battery-hand tool for plastic strapping," Orgapack, Sep. 2009 (36 pages).
Orgapack OR-T 130/260/450 "Quick Guide" distributed by The Packaging Group, dated Feb. 2017 (4 pages).
PAC Strapping—VT550L/VT700L "Plastic Strapping Tools Battery Powered Tool Solutions." Marketing Brochure, PAC Strapping, 2015 (1 page).
PAC Strapping—VT700L(H-45L) "Battery-Powered Strapping Tool" Operation and Spare Parts Manual, PAC Strapping, Jun. 2011 (28 pages).
Screenshot of Signode BXT3 battery powered strapping tool Article on IPS Packaging, taken on Jul. 19, 2017 (1 page).

(56) References Cited

OTHER PUBLICATIONS

Signode—"Signode Introduces BXT3 Plastic Strapping Tool" Press Release, published on AICC dated Jun. 18, 2018 (2 pages).
Signode—BXT3-13/16/19 Quick Manual "Quick Guide" Signode, dated Feb. 2017 (4 pages).
Fromm Operation Manual/Spare Parts List for Battery-Powered Plastic Strapping Tool for Model P331 M/HA distributed by Allstrap on Jun. 3, 2014.
BXT 2 Maintenance Manual, https://usastrap.com/wp-content/uploads/Signode_BXT2_Maintenance-Manual_Battery_Hand_Tool.pdf, dated Mar. 2011.
BXT2-19 Battery Powered Combination Tool for Polyester Strapping, Signode BXT2-19 battery powered combination tool for polyester strapping PDF.pdf, dated Nov. 19, 2009.
Cyklop CMT 50—CMT Operating and Safety Instructions from serie No. 50/72611 "Hand tool for plastic strapping" dated Dec. 12, 2006, pp. 1-53.
Cyklop International—CB 130 Hand tool for PP/PET—Strapping; Traditional Tool Repair, Inc. dated Mar. 7, 2022; 22 pages.
Cyklop International CB 130 Hand Tool for PP/PET Strapping; Service for internal use only, pp. 1-36 dated Aug. 5, 2022.
Cyklop International CB 130 Hand Tool for PP/PET Strapping; Service for internal use only, pp. 1-39, dated Aug. 2002.
Cyklop International-CMT 250 "Battery-hand tool for plastic strapping" dated Sep. 4, 2009, pp. 1-36.
Cyklop International-CP 500 "Strapping hand tool CP500 Pneumatic Hand Tool" dated Sep. 1, 2008, pp. 1-2.
Fromm Operation Manual/Spare Parts List for Battery-Powered Strapping Tool for Model P331 M/HA distributed by Allstrap on Oct. 1, 2014, pp. 1-26.
Fromm Operations Manual/Spare Parts List for Battery-Powered Plastic Strapping Tool Model P320, 43.0324.02, 10 pages, dated Apr. 1999.
Fromm Operations Manual/Spare Parts List for Battery-Powered Plastic Strapping Tool Model P330, 43.0264.01, pp. 1-26, dated May 2009.
Fromm Operations Manual/Spare Parts, Traditional Tool, https://traditionaltool.com/content/ttr_specs_docs/MANUALS/Fromm%20Manuals/13.4210%20%20A452%20v1.pdf, dated Mar. 27, 2001.
Orgapack Operating and Safety Instructions OR-T 50 From Serie No. 50/61650 Hand tool for plastic strapping, pp. 1-19, dated Dec. 2006.
Orgapack, Hand Tools for Plastic Strapping, https://web.archive.org/web/20130319062730/http://www.orgapack.com/Portaldata/4/Resources/info_center/downloads/PTool_EN.pdf, dated Mar. 19, 2013.
Signode Operation, Parts and safety manual, VXT2-16/19 Tension-Weld Strapping Tool, pp. 1-36, Dated May 2003.
Allstrap Operation, Parts, and Safety Manual, Signode BXT2-19 Battery-Hand Tool for Plastic Strapping, pp. 1-36, dated Sep. 2009.
Cyklop International—CB 130 "Hand Tool for PP/PET-strapping," Operating Manual, Traditional Tool Repair Inc., dated Jan. 17, 2005. (22 pages).
Cyklop International—CE 92/CLT 100/CHT 400 "Cyklop Plastic Strapping Hand Tools" Marketing Brochure, Cyklop International, dated 2009. (6 pages).
Cyklop International—CHT 300 "Battery-hand tool for plastic strapping" Operating Manual, Traditional Tool Repair Inc., dated Dec. 2007. (53 pages).
Cyklop International—CHT 400 "Spare Parts List" dated Sep. 2009 (6 pages).
Cyklop International—CLT 100 "Cyklop Plastic Strapping Hand Tools," Marketing Brochure, Cyklop International, dated 2009. (6 pages).
Cyklop International—CMT 200 "Battery-hand tool for plastic strapping" Operating Manual, Traditional Tool Repair Inc., dated Jan. 2008. (53 pages).
Cyklop International—CMT 260 "CLT 130/CMT 260/CHT450 Battery-hand tool for plastic strapping" Operating Manual, Traditional Tool Repair Inc., dated Mar. 2017. (28 pages).
Cyklop International—CMT 50 "Hand tool for plastic strapping" Operating Manual, Cyklop International, dated Feb. 2008, (53 pages).
Cyklop International—CP 500 "Hand Tool for PP/PET-strapping" Operating Manual, Traditional Tool Repair Inc., dated Jun. 2009. (28 pages).
Cyklop International—PN 6.1 "Steel Strap—Strapping Tools" Marketing Brochure, Cyklop International, dated 2009. (2 pages).
Cyklop International, "Cyklop completes its hand tool range with new CP500 pneumatic strapper" Warehouse & Logistics News, dated Sep. 30, 2008 (2 pages).
Fromm Operation Manual/Spare Parts List, "Battery-Powered Plastic Strapping Tool Model P328 M/HA 43.2462.01," dated Jan. 2015 (26 pages).
Fromm Operations Manual/Spare Parts list "Battery—Powered Plastic Strapping Tool Model P324 43.0662.01," dated Nov. 14, 2008 (26 pages).
Fromm Operations Manual/Spare Parts list "Battery—Powered Plastic Strapping Tool Model P325 43.0733.01," Distributed by Allstrap, Mar. 2007 (26 pages).
Fromm Operations Manual/Spare Parts list "Pneumatic Plastic Strapping Tool Model P350 Semi-Automatic 49.4211.02," Distributed by Allstrap, on Sep. 12, 2014 (28 pages).
Greenbridge—Evolution LT, Operation Manual/Spare Parts List, "Battery Powered Plastic Strapping Tool," Greenbridge, dated Apr. 2021 (40 pages).
Orgapack—OR-H 20 A Operating and Safety Instructions "Hand tool for steel strapping" Orgapack, dated May 2001 (62 pages).
Orgapack—OR-T 120 Operating Manual "Battery-operated hand tool for plastic strapping," Orgapack, Oct. 2015 (36 pages).
Orgapack—OR-T 130/260/450 Operating Manual "Battery-operated hand tool for plastic strapping," Orgapack, Mar. 2017 (28 pages).
Orgapack—OR-T 200 Operating Manual "Battery-hand tool for plastic strapping," Traditional Tool Repair Inc., Feb. 2004 (31 pages).
Orgapack—OR-T 250 Operating Manual "Battery-hand tool for plastic strapping," Traditional Tool Repair Inc., Jul. 2009 (33 pages).
Orgapack—OR-T 400 Operating Manual "Battery-hand tool for plastic strapping," Traditional Tool Repair Inc., Sep. 2009 (33 pages).
PAC Strapping—VT530(Helios H-45)"Battery-Powered Manual Tool for Plastic Strapping" Operation Manual and Spare Parts List, PAC Strapping, Jul. 7, 2007 (27 pages).
PAC Strapping—VT550L/VT700L(H-45L) "Battery-Powered Strapping Tool" Operation, Safety and Spare Parts Manual, PAC Strapping, Oct. 2015 (28 pages).
Polychem—B1200 "Polychem News You Can Use," News Release, Polychem Corporation vol. 11, Issue 1, Dated Apr. 2015 (1 page).
Polychem Corporation—B1200 "Battery Powered Plastic Strapping Tool" Operation Manual, Downloaded from www.Manualslib.com, Oct. 2014 (32 pages).
Polychem Corporation—B400 "Battery Powered Plastic Strapping Tool" Operation Manual/Spare Parts List, Polychem Corporation, Sep. 2011 (20 pages).
Samuel—STL-3SD "Model STL-3 Series Battery Operated Plastic Strapping Tool for Polyester and Polypropylene," Information Sheet, Samuel Packaging Systems Group, dated Jun. 2019 (2 pages).
SIAT—GT-One "GT One" Operating Manual, dated Apr. 2016 (102 pages).
SIAT—GT-Series Datasheet "Battery Strapping Tools for PP/PET" dated Jun. 2021 (2 pages).
SIAT—GT-Smart "Battery Strapping Tools for Plastic Strap," Smart Brochure, Jan. 2020 (4 pages).
SIAT—GT-Smart Youtube Video https://www.youtube.com/watch?v=74OZCJi5drc&list=PLS5ECi83i7Xql89eVLTynUhfEGWOSfcn8&index=6, posted by user SIAT S.p.A., dated May 9, 2016.
SIAT—GTH 19-25 "GT19-25" Operating Manual, PDF dated May 31, 2016 (102 pages).
Signode—BPT-L19 Service Manual "Battery-operated strapping tool for steel strapping 13, 16, 19 mm," Evers GmbH, dated Nov. 24, 2021 (41 pages).

(56) References Cited

OTHER PUBLICATIONS

Signode—BST/BPT Series Data Sheet "Battery Powered Tools for Steel Strapping," Signode dated 2021 (2 pages).
Signode—BXT2 "BXT2-19 Maintenance Manual," dated Mar. 2011 (33 pages).
Signode—BXT2 Operating Manual "Battery-Hand Tool for Plastic Strapping," Downloaded from http://www.manualslib.com/, dated Jul. 2009 (36 pages).
Signode—BXT3-13/16/19 Operating Manual "Battery-operated hand tool for plastic strapping," Signode, dated Feb. 2020 (28 pages).
Signode—BXT3-13/16/19 Service Manual "Battery-operated hand tool for plastic strapping," Signode, dated Jun. 30, 2017 (37 pages).
Signode—BXT3-32 "BXT3-32 Battery-operated strapping tool for plastic strapping" Operating Manual, Signode, dated Apr. 2021 (26 pages).
Signode—BXT3-32 "BXT3-32 Data Sheet Hand tool for plastic strapping," Signode, dated May 26, 2021 (2 pages).
Signode—BXT4-16 "Bxt4-16" Product Description from https://www.allstrap.com/bxt4-16, published 2024 (2 pages).
Signode—Grippack "Battery Powered Tensioner," Signode, dated Oct. 2014 (28 pages).
Signode—GripPack RCBS/RCBD Data Sheet "Battery-powered sealer for steel strap," Signode Industrial Group, dated 2018 (2 pages).
Strapex—STB 63 Operating Manual "Battery-hand tool for plastic strapping" Downloaded from http://www.manualslib.com/, dated Oct. 11, 2005 (53 pages).
Strapex—STB 65 Operating Manual "Battery-hand tool for plastic strapping" Downloaded from http://www.manualslib.com/, dated Oct. 11, 2005 (53 pages).
Strapex—STR 64 Operating Manual "Pneumatic hand tool for steel strapping" Downloaded from http://www.manualslib.com/, dated Dec. 18, 2009 (47 pages).
Titan_13 HPE-L "HPE-L 224 0002000 Combined strapping tool for steel strap" Operating Manual, Titan, PDF dated 2011 (15 pages).
Titan—TA 220/400 "TA 220 Battery powered strapping tool for plastic strap" Operating Instructions, Titan, dated Oct. 19, 2012 (64 pages).
Titan—TA 250/450 "TA 250/TA Battery powered strapping tool for plastic strap" Operating Manual, Titan, PDF dated Sep. 2016 (112 pages).
Titan—TA750 "TA750 Battery powered strapping tool for plastic strap" Operating Manual, Titan, PDF dated 2018 (98 pages).
PCT International Search Report and Written Opinion on PCT Application No. PCT/US2023/079035 dated Mar. 11, 2024.

\* cited by examiner

HANDHELD STRAPPING DEVICE

BACKGROUND

Devices can be used to secure straps around objects. The straps can be secured to one another.

SUMMARY

At least one aspect is directed to a strapping device. The strapping device can include a grip member. The strapping device can include a first actuator coupled with the grip member to move the grip member between a first position and a second position. The strapping device can include a sensor to detect an electrical characteristic of the first actuator and transmit a signal indicative of the electrical characteristic. The strapping device can include a data processing system communicably coupled with the first actuator and the sensor. The data processing system can receive the signal indicative of the electrical characteristic. The data processing system can determine the grip member is in contact with a welding component based, at least partially, on the electrical characteristic. The data processing system can transmit a first control signal to the first actuator to position the grip member at the second position based on the grip member being in contact with the welding component. The data processing system can transmit a second control signal to the first actuator and a second actuator to initiate a welding cycle to weld the welding component such that the welding cycle initiates with the grip member at the second position.

At least one aspect is directed to a method. The method can include moving a grip member of a strapping device from a first position toward a welding component via an actuator of the strapping device. The method can include determining the grip member is contacting the welding component. The method can include moving the grip member to a second position based on the grip member contacting the welding component. The method can include initiating a welding cycle to friction weld the welding component such that the welding cycle initiates with the grip member at the second position.

At least one aspect is directed to a welding system. The welding system can include a data processing system. The data processing system can be communicably coupled with a sensor, a first actuator, and a second actuator. The sensor can detect an electrical characteristic of the first actuator indicative of a grip member of a welding assembly contacting a welding component. The first actuator can move the grip member. The second actuator can move a portion of the welding component. The data processing system can receive a signal indicative of the electrical characteristic. The data processing system can determine the grip member is in contact with the welding component based, at least partially, on the electrical characteristic. The data processing system can transmit a first control signal to the first actuator to position the grip member at a second position based on the grip member being in contact with the welding component. The data processing system can transmit a second control signal to the first actuator and the second actuator to initiate a welding cycle to weld the welding component such that the welding cycle initiates with the grip member at the second position.

DETAILED DESCRIPTION

Figure 1:
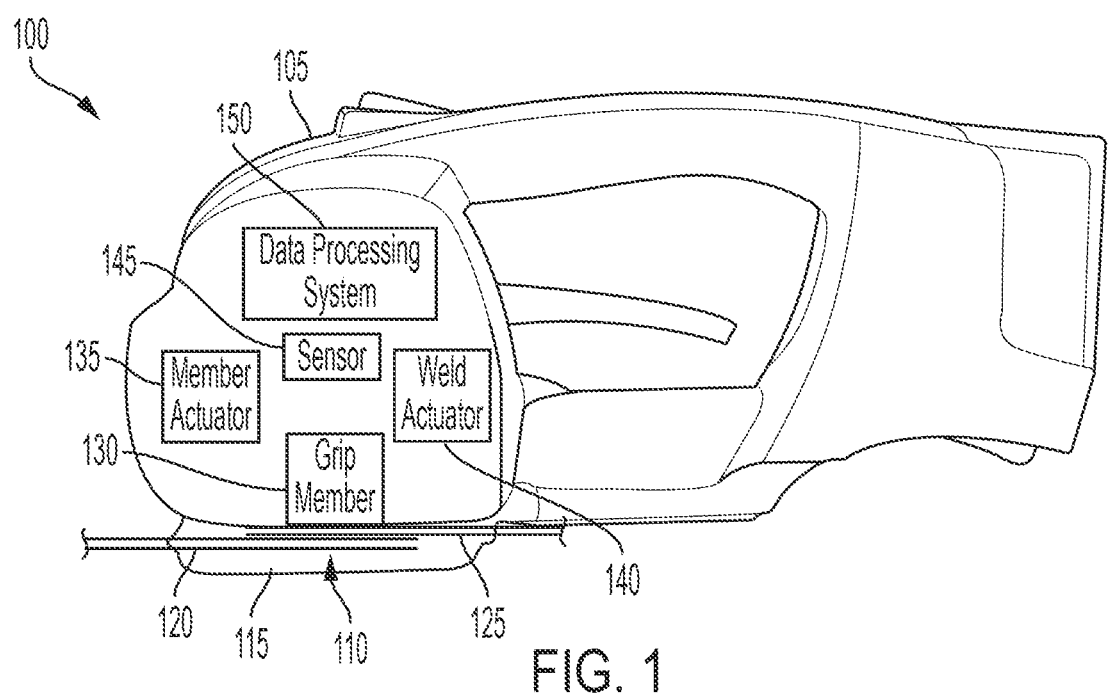
FIG. 1 depicts an example strapping device, according to some aspects.

Following below are more detailed descriptions of various concepts related to, and implementations of, methods, apparatuses, and systems of welding a component via friction welding. The various concepts introduced above and discussed in greater details below may be implemented in any of numerous ways.

The present disclosure is directed to systems and methods for using a computing system to detect a thickness of a welding component (e.g., a strap) that is to be friction welded and automatically adjusting a strapping device to accommodate the thickness of the welding component to achieve a proper weld while reducing the amount of additional wear experienced by the strapping device. The disclosed solutions can have the technical advantage of modifying mechanical aspects of a strapping device without manually modifying physical parts of the strapping device (e.g., adding/removing parts). The disclosed solutions can perform a custom weld cycle with custom welding parameters that are specific to the welding component and the strapping device without having to manually adjust the strapping device. As such, a single strapping device can automatically modify mechanical aspects and welding parameters to create a proper weld for welding components with various thicknesses. For example, the disclosed solutions can prevent the strapping device from starting a welding cycle too soon such that the welding cycle results in scuffing and under-welding and prevent the strapping device from starting a welding cycle too late such that there is too much friction in the device such that the motor cannot overcome the friction to initiate the welding cycle.

The disclosed solution can include a strapping device. The strapping device can be or include a friction welding strapping device. The strapping device can include a weld assembly. The weld assembly can include a first actuator (e.g., a servo motor), a cam to be driven by the first actuator, and a member to be driven by the cam. The member can move within the strapping device to contact a welding component (e.g., a component to be welded). The member can start in a first position (e.g., a retracted/open/stored position) such that the welding component can be positioned within the strapping device. The member can move in a first direction (e.g., toward the welding component) to contact the welding component. The strapping device can include a data processing system. The data processing system can detect when the member contacts the welding component. For example, the strapping device can include a sensor that detects an electrical characteristic (e.g., a current) of the first actuator. The sensor can transmit a signal indicative of the electrical characteristic to the data processing system. The data processing system can compare the electrical characteristics to a threshold indicative of the first actuator contacting the welding component. For example, the threshold can be a current value or a change in current. The threshold can be tailored to the first actuator or the strapping device (e.g., based on age of actuator or number of welds performed by the actuator). When the electrical characteristic meets or exceeds the threshold, the data processing system can determine that the arm is in contact with the welding component.

The data processing system can determine a thickness of the welding component. For example, the device can have a base. The welding component can be disposed between the base and the member. The data processing system can determine a distance between the base and the member when the member contacts the welding component. For example, the data processing system can determine how far the member has traveled from the first position when the member contacts the welding component. The distance can be the thickness of the welding component. Based on the thickness of the welding component, the data processing system can determine a second position for the member. The second position can be a motor starting position for the member to facilitate proper friction welding of the welding component. For example, the second position can prevent the member from applying too little pressure to the welding component to prevent a final weld from being insufficient and can prevent the member from applying too much pressure to the welding component such that the member does not prevent the welding component from moving to create the friction needed to create the weld.

The strapping device can include a second actuator. With the member in the second position, the data processing system can transmit a control signal to the first actuator and the second actuator to initiate a welding cycle. The second actuator can move a first portion of the welding component to create friction between the first portion and a second portion. The first actuator can move the member toward the welding component to a third position to increase the friction between the first portion and the second portion. The member can remain in the third position during a cooling portion of the welding cycle.

The data processing system can perform real-time signal processing to determine the thickness of the welding component, adjust the strapping device based on the thickness of the welding component, and perform a customized welding cycle to generate a proper friction weld. These determinations and adjustments can be specifically tailored for any individual strapping device.

FIG. 1 depicts an example device, shown as strapping device 100. The strapping device 100 can be handheld. For example, the strapping device 100 can be less than a threshold weight to facilitate manual manipulation of the strapping device 100 with a single hand. The strapping device 100 can have a body 105. The body 105 can be a housing for the various mechanisms and components described herein to facilitate a welding cycle to weld a welding component 110. For example, the body 105 can include a base member 115. The body 105 can receive a welding component 110 to be welded and the base member 115 can support the welding component 110. The welding component 110 can include a first portion, shown as base portion 120, and a second portion, shown as actuator portion 125, to be welded together. The strapping device 100 can include a grip member 130. The grip member 130 can selectively engage and disengage with the welding component 110 to facilitate the welding cycle.

The strapping device 100 can include at least one actuator. For example, the strapping device 100 can include a first actuator, shown as member actuator 135. The member actuator 135 can move the grip member 130 to selectively engage and disengage the welding component 110 to provide a desired amount of friction between the base portion 120 and the actuator portion 125 of the welding component 110. The strapping device 100 can include a second actuator, shown as weld actuator 140. The weld actuator 140 can selectively engage and disengage with a portion of the welding component 110 (e.g., the actuator portion 125) to create friction between the base portion 120 and the actuator portion 125 to generate a friction weld.

The strapping device 100 can include at least one sensor 145. The sensor 145 can detect a characteristic of a component of the strapping device 100. For example, the sensor 145 can detect an electrical characteristic of the member actuator 135 (e.g., current drawn by the member actuator 135). The strapping device 100 can include at least one data processing system 150. The data processing system 150 can receive, store, and analyze data associated with the strapping device 100 and the welding component 110 to determine at least one welding cycle parameter. For example, the welding cycle parameter can include a motor starting position, a welding time, a cooling time, a holding position, a welding pressure, and an actuator speed, among others. The data processing system 150 can generate and transmit at least one control signal to actuate at least one component of the strapping device 100 according to the welding cycle parameter.

Figure 2A:
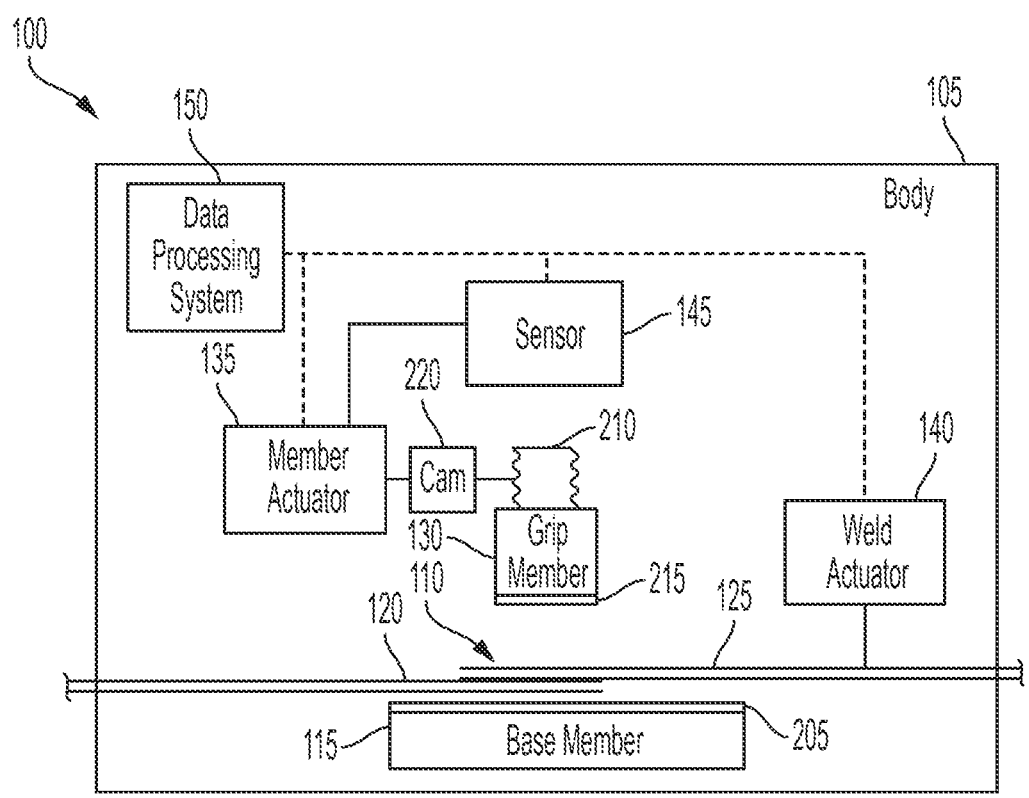
FIG. 2A is a schematic diagram of an example strapping device, according to some aspects.

FIG. 2A depicts an example schematic diagram of the strapping device 100. The body 105 can receive the base portion 120 and the actuator portion 125 of the welding component 110. For example, the base portion 120 can be a first end or a first portion of a strap and the actuator portion 125 can be a second end or a second portion of the same strap or the base portion 120 can be an end or a portion of a first strap and the actuator portion 125 can be an end or a portion of a second, different strap. The strapping device 100 can weld the portions 120, 125 of the welding component 110 together. For example, the strapping device 100 can weld the base portion 120 with the actuator portion 125 via friction welding.

The base member 115 can interface with the base portion 120 of the welding component 110 (e.g., first end of a strap or end of a first strap). The base portion 120 of the welding component 110 can be disposed between the base member 115 and the actuator portion 125 of the welding component 110 (e.g., second end of the same strap or end of a second strap). The base member 115 can support the base portion 120 and the actuator portion 125 of the welding component 110.

The base member 115 can include a grip, shown as base grip 205. The base grip 205 can be coupled with or integral with the base member 115. The base grip 205 can interface with the base portion 120 of the welding component 110. The base grip 205 can facilitate holding the base portion 120 in place during a welding cycle. The base grip 205 can be any material or texture that can increase a friction between the base member 115 and the base portion 120 of the welding component 110 to prevent the base portion 120 from moving relative to the base member 115 during a welding cycle.

The grip member 130 of the strapping device can interface with an opposite side of the welding component 110 than the base member 115. For example, the grip member 130 can interface with the actuator portion 125 of the welding component 110. For example, a first end of a strap can interface with the base member 115 and a second end of the strap can interface with the grip member 130. The base portion 120 and the actuator portion 125 of the welding component 110 can be disposed between the base member 115 and the grip member 130.

The grip member 130 can include or be coupled with a compressible member 210. The compressible member 210 can be disposed between the grip member 130 and the member actuator 135. The member actuator 135 can be coupled with the grip member 130 via the compressible member 210. The compressible member 210 can be, for example, a spring. The member actuator 135 can compress or decompress the compressible member 210 to adjust a pressure (e.g., the welding pressure) that the grip member 130 applies to the welding component 110. For example, member actuator 135 can move the grip member 130 such that the grip member 130 can contact the welding component 110. With the grip member 130 in contact with the welding component 110, the member actuator 135 can compress the compressible member 210 to increase a pressure applied to the welding component 110 via the grip member 130 or decompress the compressible member 210 to decrease the pressure applied to the welding component 110. The grip member 130 can remain stationary as the member actuator 135 adjusts the compressible member 210.

The grip member 130 can include a grip, shown as member grip 215. The member grip 215 can be coupled with or integral with the grip member 130. The member grip 215 can interface with the actuator portion 125 of the welding component 110. The member grip 215 can increase friction between the actuator portion 125 and the grip member 130 during the welding cycle. The base portion 120 and the actuator portion 125 can be disposed between the base grip 205 and the member grip 215. The member grip 215 can be any material or texture that can increase a friction between the grip member 130 and the actuator portion 125 of the welding component 110.

The member actuator 135 of the strapping device 100 can be coupled with the grip member 130 to move the grip member 130 within the body 105. For example, the member actuator 135 can move the grip member 130 between a first position and a second position to selectively engage and disengage the welding component 110. The member actuator 135 can be coupled with the compressible member 210 of the grip member 130. For example, the member actuator 135 can move the grip member 130 via the compressible member 210. With the grip member 130 in contact with the welding component 110, the member actuator 135 can continue to move (e.g., compress or decompress) the compressible member 210 to adjust the pressure applied to the welding component 110.

The strapping device 100 can include a cam 220. The member actuator 135 can be coupled with the grip member 130 via the cam 220. For example, the cam 220 can be disposed between the member actuator 135 and the grip member 130. The cam 220 can be disposed between the member actuator 135 and the compressible member 210. The member actuator 135 can be coupled with the cam 220 and can rotate the cam 220 such that the cam 220 can move (e.g., push or pull) the grip member 130 in a desired direction. With the grip member 130 in contact with the welding component 110, the cam 220 can continue to move (e.g., compress or decompress) the compressible member 210 to adjust the pressure applied to the welding component 110.

The weld actuator 140 of the strapping device 100 can couple with or interface with at least one of the welding component 110 and the base member 115 to facilitate welding of the welding component 110. For example, the weld actuator 140 can engage the actuator portion 125 of the welding component 110 to move the actuator portion 125 relative to the base portion 120 to create friction between the actuator portion 125 and the base portion 120 and weld the actuator portion 125 with the base portion 120 via friction welding. For example, the member actuator 135 can move the grip member 130 to the first position (e.g., open or stored position) such that the welding component 110 can move into the body 105. The member actuator 135 can move the grip member 130 to the second position (e.g., a motor starting position) to facilitate actuation of a welding cycle. For example, having the grip member 130 in the second position can create a desired amount of friction between the base portion 120 and the actuator portion 125 at a beginning of a welding cycle, but not too much friction that prevents the weld actuator 140 from being able to move the actuator portion 125 relative to the base portion 120. The weld actuator 140 can move the actuator portion 125 between the grip member 130 and the base member 115 to generate the friction needed to weld the actuator portion 125 with the base portion 120. The member actuator 135 can be or include any type of motor. For example, the member actuator 135 can be a servo motor. The weld actuator 140 can be or include any type of motor. For example, the weld actuator 140 can be a brushless DC motor.

The weld actuator 140 can engage the base member 115 to move the base member 115 relative to the welding component 110. For example, the weld actuator 140 can move the base member 115 side to side to create friction between the actuator portion 125 and the base portion 120 and weld the actuator portion 125 with the base portion 120 via friction welding.

The sensor 145 of the strapping device 100 can detect a characteristic of at least one of the components of the strapping device 100. For example, the sensor 145 can detect a characteristic of the member actuator 135. The characteristic can be, for example, an electrical characteristic of the member actuator 135. The electrical characteristic can be, for example, current, power consumption, or resistance felt by the member actuator 135. The sensor 145 can be electrically coupled with the member actuator 135 to detect the electrical characteristic of the member actuator 135. The characteristic can be, for example, a physical characteristic of the grip member 130. The physical characteristic can be, for example, a force felt by a surface of the grip member 130 that contacts the welding component 110 or a distance detected between the grip member 130 and the welding component 110. The sensor 145 can be a part of the grip member 130 or be disposed in the body 105 at a location such that the sensor 145 can observe the grip member 130 (e.g., see the distance between the grip member and the welding component 110). The sensor 145 can be any sensor capable of detecting such characteristics. For example, the sensor 145 can be a pressure sensor, a current sensor, or a distance sensor, among others.

The sensor 145 can transmit a signal indicative of a detected characteristic. For example, the sensor 145 can transmit a signal to the data processing system 150 that indicates the detected characteristic.

The data processing system 150 of the strapping device 100 can be disposed in the body 105 of the strapping device 100 or can be disposed outside of the strapping device (e.g., at a remote location). The data processing system 150 can receive or transmit signals between at least one of the components of the strapping device 100. For example, the data processing system 150 can be communicably coupled with the sensor 145. The data processing system 150 can receive a signal indicative of a characteristic of a component from the sensor 145. For example, the data processing system 150 can receive a signal indicative of an electrical characteristic of the member actuator 135. The data processing system 150 can store and analyze the inputs received (e.g., data, signals) received and can generate outputs (e.g., control signals) based, at least partially, on the inputs. For example, the data processing system 150 can be communicably coupled with the member actuator 135. The data processing system 150 can generate and transmit a control signal to the member actuator 135. The control signal can cause the member actuator 135 to move the grip member 130 to a desired position. The data processing system 150 can be communicably coupled with the weld actuator 140. For example, the data processing system 150 can generate and transmit a control signal to the weld actuator 140. The control signal can cause the strap actuator to initiate a welding cycle by initiating movement of the actuator portion 125 of the welding component 110.

Figure 2B:
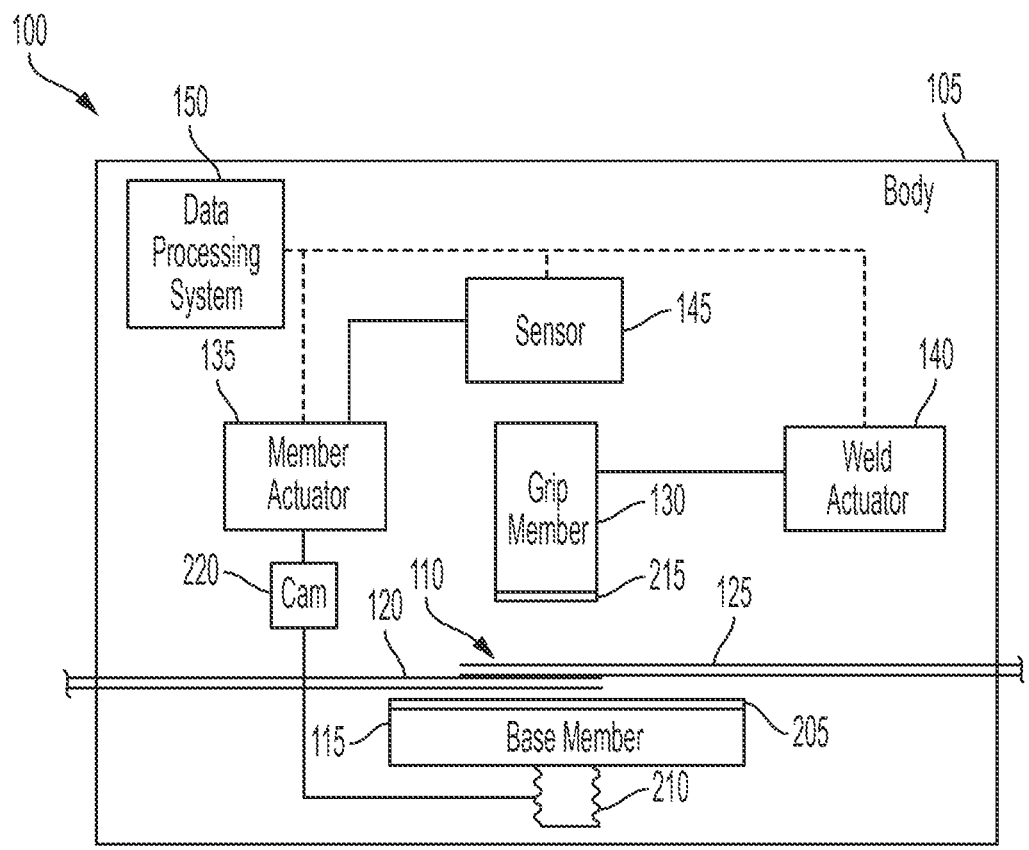
FIG. 2B is a schematic diagram of an example strapping device, according to some aspects.

FIG. 2B depicts an example schematic diagram of the strapping device 100. The base member 115 can include or be coupled with the compressible member 210. The compressible member 210 can be disposed between the base member 115 and the member actuator 135. The member actuator 135 can be coupled with the base member 115 via the compressible member 210. The member actuator 135 can compress or decompress the compressible member 210 to adjust a pressure that the base member 115 applies to the welding component 110. For example, member actuator 135 can move the base member 115 to move the welding component 110 toward the grip member 130 such that the grip member 130 and the base member 115 can contact the welding component 110. With the grip member 130 in contact with the welding component 110, the member actuator 135 can compress the compressible member 210 to increase a pressure applied to the welding component 110 via the base member 115 or decompress the compressible member 210 to decrease the pressure applied to the welding component 110. The base member 115 can remain stationary as the member actuator 135 adjusts the compressible member 210.

For example, the member actuator 135 can move the base member 115 between a first position and a second position to selectively engage and disengage the welding component 110 with both the grip member 130 and the base member 115. The strapping device 100 can include a cam 220. The member actuator 135 can be coupled with the base member 115 via the cam 220. For example, the cam 220 can be disposed between the member actuator 135 and the base member 115. The cam 220 can be disposed between the member actuator 135 and the compressible member 210. The member actuator 135 can be coupled with the cam 220 and can rotate the cam 220 such that the cam 220 can move (e.g., push or pull) the base member 115 in a desired direction. With the grip member 130 in contact with the welding component 110, the cam 220 can continue to move (e.g., compress or decompress) the compressible member 210 to adjust the pressure applied to the welding component 110 via the base member 115.

The weld actuator 140 of the strapping device 100 can couple with or interface with at least one of the welding component 110 and the grip member 130 to facilitate welding of the welding component 110. For example, the weld actuator 140 can engage the actuator portion 125 of the welding component 110 to move the actuator portion 125 relative to the base portion 120 to create friction between the actuator portion 125 and the base portion 120 and weld the actuator portion 125 with the base portion 120 via friction welding. For example, the member actuator 135 can move the base member 115 to the first position (e.g., open or stored position) such that the welding component 110 can move into the body 105. The member actuator 135 can move the base member 115 to the second position (e.g., a motor starting position) to facilitate actuation of a welding cycle. For example, having the base member 115 in the second position can create a desired amount of friction between the base portion 120 and the actuator portion 125 of the welding component at a beginning of a welding cycle, but not too much friction that prevents the weld actuator 140 from being able to move the actuator portion 125 relative to the base portion 120. The weld actuator 140 can move the actuator portion 125 between the grip member 130 and the base member 115 to generate the friction needed to weld the actuator portion 125 with the base portion 120.

The weld actuator 140 can engage the grip member 130 to move the grip member 130 relative to the welding component 110. For example, the weld actuator 140 can move the grip member 130 side to side to create friction between the actuator portion 125 and the base portion 120 and weld the actuator portion 125 with the base portion 120 via friction welding.

Figure 3:
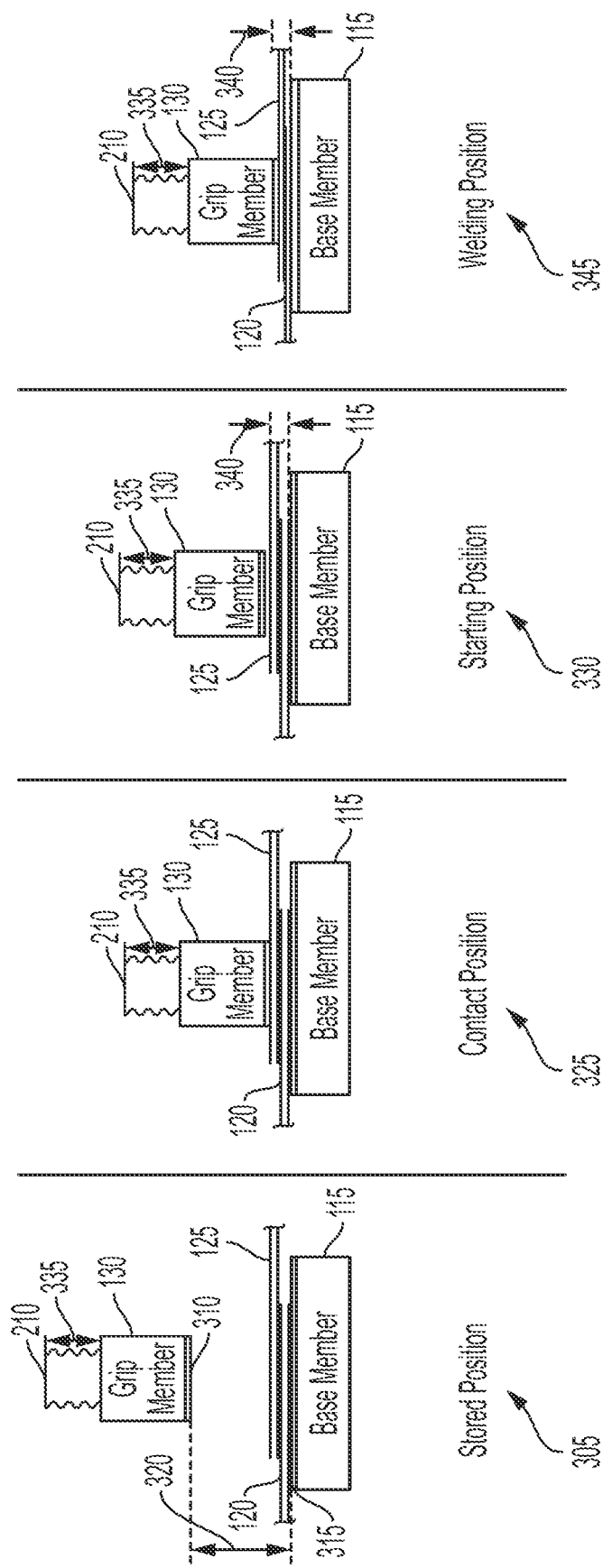
FIG. 3 depicts side views of example positions of a grip member, according to some aspects.

FIG. 3 depicts side views of a plurality of example positions of the grip member 130 and the compressible member 210. For example, the grip member 130 and the compressible member 210 can have a first position, shown as stored position 305. The stored position 305 can be a stored or unactuated position for the grip member 130 and the compressible member 210 when the strapping device 100 is not being used. For example, the stored position 305 of the compressible member 210 can include the compressible member 210 having a first length 335. The first length 335 can be a natural or relaxed length due to no external forces being applied to the compressible member 210. The stored position 305 of the grip member 130 can be disposed away from the base member 115. For example, the grip member 130 can have a member contact surface 310. The member contact surface 310 can be configured to interface with the actuator portion 125 of the welding component 110 during a welding cycle. The member contact surface 310 can be a surface of the grip member 130 or a surface of the member grip 215. The base member 115 can have a base contact surface 315. The base contact surface 315 can interface with the base portion 120 of the welding component 110. The base contact surface 315 can be a surface of the base member 115 or a surface of the base grip 205. The stored position 305 can be a programmed or predetermined position. For example, the stored position 305 can include the member contact surface 310 being disposed a distance 320 away from the base contact surface 315. The distance 320 can be a predetermined distance. The distance 320 can be large enough such that the welding component 110 can enter the strapping device 100 and the member contact surface 310 is not in contact with the welding component 110.

The grip member 130 and the compressible member 210 can have a second position, shown as contact position 325. The contact position 325 can be when the member contact surface 310 of the grip member 130 initiates contact with the actuator portion 125 of the welding component 110. The contact position 325 of the grip member 130 can be the location of the grip member 130 when the grip member 130 contacts the actuator portion 125. For example, the member actuator 135 can move the grip member 130 in a first direction (e.g., down) from the stored position 305 until the grip member 130 contacts the actuator portion 125. The location of the actuator portion 125 can define the contact position 325. The contact position 325 can be a detectable position. For example, the sensor 145 can detect when the member contact surface 310 contacts the actuator portion 125 of the welding component 110. For example, the sensor 145 can be a current sensor and detect a current that is being used by the member actuator 135 as the member actuator 135 moves the grip member 130 from the stored position 305 toward the contact position 325. The sensor 145 can detect an increase in current when the member contact surface 310 contacts the member actuator 135 due to an increase in resistance due to the contact with the actuator portion 125. The increase in the current can indicate the contact between the member contact surface 310 and the actuator portion 125 of the welding component 110. The contact position 325 of the compressible member 210 can include the compressible member 210 having a second length 335. For example, the compressible member 210 may be compressed when the grip member 130 contacts the actuator portion 125 of the welding component 110 such that the second length 335 is less than the first length 335 from the stored position 305.

The grip member 130 and the compressible member 210 can have a third position, shown as starting position (e.g., motor starting position) 330. The starting position 330 can be the position of the grip member 130 and the compressible member 210 when a welding cycle begins. The starting position 330 can provide a desired amount of pressure to the welding component 110 such that there is enough pressure to create the friction needed to generate the weld, and not too much pressure to prevent the components of the strapping device 100 from moving to create the friction. The starting position 330 of the compressible member 210 can include the compressible member 210 having a third length 335. For example, the member actuator 135 can adjust a pressure applied to the welding component 110 by compressing or decompressing the compressible member 210. Compressing the compressible member 210 such that the third length 335 is less than the second length 335 can increase the pressure. Decompressing the compressible member 210 such that the third length 335 is greater than the second length 335 can decrease the pressure. The starting position 330 of the grip member 130 can include moving the grip member 130 a distance away from the contact position 325 of the grip member 130 or keeping the grip member 130 at the contact position 325. Moving the grip member 130 can adjust the pressure that the grip member 130 applies to the welding component 110. The member actuator 135 can move the grip member 130 in the first direction or in a second, opposite direction (e.g., up) to move the grip member 130 from the contact position 325 to the starting position 330. For example, the member actuator 135 can move the grip member 130 further in the first direction to increase the pressure and can move the grip member in the second, opposite direction to decrease the pressure. Adjusting the compressible member 210 can adjust the pressure enough such that the contact position 325 and the starting position 330 of the grip member 130 are the same position for the grip member 130.

The starting position 330 can be a programmable position. The starting position 330 can be a relative position. For example, the starting position 330 can be based, at least partially, on the contact position 325. For example, the starting position 330 for the grip member 130 or the compressible member 210 can be a predetermined distance (e.g., in either direction) away from the contact position 325. The starting position 330 can be based, at least partially, on a thickness 340 of the welding component 110. For example, a larger thickness 340 can be associated with a larger predetermined distance and a smaller thickness 340 can be associated with a smaller predetermined distance, or vice versa. The starting position 330 can be based, at least partially, on the detected characteristic of the component of the strapping device 100. For example, a detected current that is below a threshold may indicate that the grip member 130 or the compressible member 210 can move further in the first direction and a detected current that is above a threshold may indicate that the grip member 130 or the compressible member 210 can move in the second direction. The starting position 330 can be a motor starting position such that the weld actuator 140 actuates to initiate a welding cycle when the grip member 130 and the compressible member 210 are in the starting position 330.

The starting position 330 for at least one of the grip member 130 and the compressible member 210 can be the same as the contact position 325. For example, the starting position 330 can include the grip member 130 remaining stationary in the contact position 325 and the member actuator 135 compressing or decompressing the compressible member 210 to adjust the pressure applied to the welding component 110. The compressible member 210 can have a first length 335 (e.g., natural length) with the grip member 130 in the stored position 305. The compressible member 210 can have a second length (e.g., shorter than the first length) with the grip member 130 in the contact position 325. The compressible member 210 can have a third length (e.g., shorter or longer than the second length) when in the starting position 330 with the grip member 130 in the starting position 330. For example, the member actuator 135 can compress the compressible member 210 from the second length 335 to the third length 335 to increase the pressure applied to the welding component 110 via the grip member 130. The member actuator 135 can decompress (e.g., extend) the compressible member 210 from the second length 335 to the third length 335 to decrease the pressure applied to the welding component 110 via the grip member 130. The member actuator 135 can move the grip member 130 without moving the compressible member 210 to get to the starting position 330 from the contact position 325. The member actuator 135 can not move either of the grip member 130 and the compressible member 210 to get to the starting positing 330 from the contact position 325. For example, with the grip member 130 and the compressible member 210 in the contact position 325, a desired pressure is applied to the welding component 110 such that the member actuator 135 does not need to adjust either the grip member 130 or the compressible member 210 to achieve the desired pressure.

The grip member 130 compressible member 210 can have a fourth position, shown as welding position 345. The welding position 345 can include the grip member 130 and the compressible member 210 being at a position or length during at least a portion of a welding cycle or adjusting the position or length during the welding cycle to facilitate proper welding and cooling of the welding component 110. The grip member 130 and the compressible member 210 can be in the welding position 345 as the strapping device 100 is actively welding the actuator portion 125 with the base portion 120 and as the welding component 110 cools after being welded. The welding position 345 of the compressible member 210 can include the compressible member 210 having a fourth length 335. For example, the member actuator 135 can compress the compressible member 210 from the starting position 330 such that the fourth length 335 is less than the third length 335 to increase the pressure applied to the welding component 110. The welding position 345 of the grip member 130 can include the grip member 130 being in a fourth position. For example, the fourth position can be closer to the base member 115 than the third position to increase the pressure applied to the welding component 110. The welding position 345 can be a programmable position. For example, the welding position 345 can be based, at least partially, on at least one of the contact position 325 (e.g., a predetermined distance from the contact position 325), the starting position 330 (e.g., a predetermined distance from the starting position 330), and the thickness 340 of the welding component 110 (e.g., welding position 345 is to position the grip member 130 such that the welding component 110 is compressed to a thickness that is a predetermined percentage of the original, non-compressed thickness 340). The welding position 345 can be a detectable position. For example, a sensor 145 can detect when the grip member 130 is pressing hard enough on the welding component 110 (e.g., the sensor 145 detects a threshold current being used by the member actuator 135 or a threshold pressure felt by the member contact surface 310).

The welding position 345 can also be the same as at least one of the contact position 325 and the starting position 330 with respect to the location of the grip member 130 and the length 355 of the compressible member 210. The welding position 345 can be different from at least one of the contact position 325 and the starting position 330 with respect to at least one of the location of the grip member 130 and the length 335 of the compressible member 210. For example, the welding position 345 can include the grip member 130 remaining stationary in at least one of the contact position 325 and the starting position 330 and the member actuator 135 compressing or decompressing the compressible member 210 to adjust the pressure applied to the welding component 110. For example, the compressible member 210 can have a fourth length 335. The fourth length 335 can be less than the third length 335 (e.g., the starting position 330). The fourth length 335 can provide the desired amount of pressure to weld the welding component 110 together.

While the above examples refer to the compressible member 210 being coupled with the grip member 130 and member actuator 135 adjusting the pressure applied to the welding component 110 by adjusting at least one of the length 335 of the compressible member 210 and the location of the grip member 130, the same concepts can be applied with the compressible member 210 being coupled with the base member 115 and the member actuator 135 adjusting the pressure applied to the welding component 110 by adjusting at least one of the length 335 of the compressible member 210 and the location of the base member 115. For example, the member actuator 135 can move the base member 115 toward the grip member 130, and adjust the pressure applied to the welding component 110 by compressing or decompressing the compressible member 210 that is coupled with the base member 115. The concepts can also be applied to a strapping device 100 that does not include a compressible member 210. For example, the pressure applied to the welding component 110 can be adjusted solely by movement of the grip member 130 or the base member 115.

Figure 4:
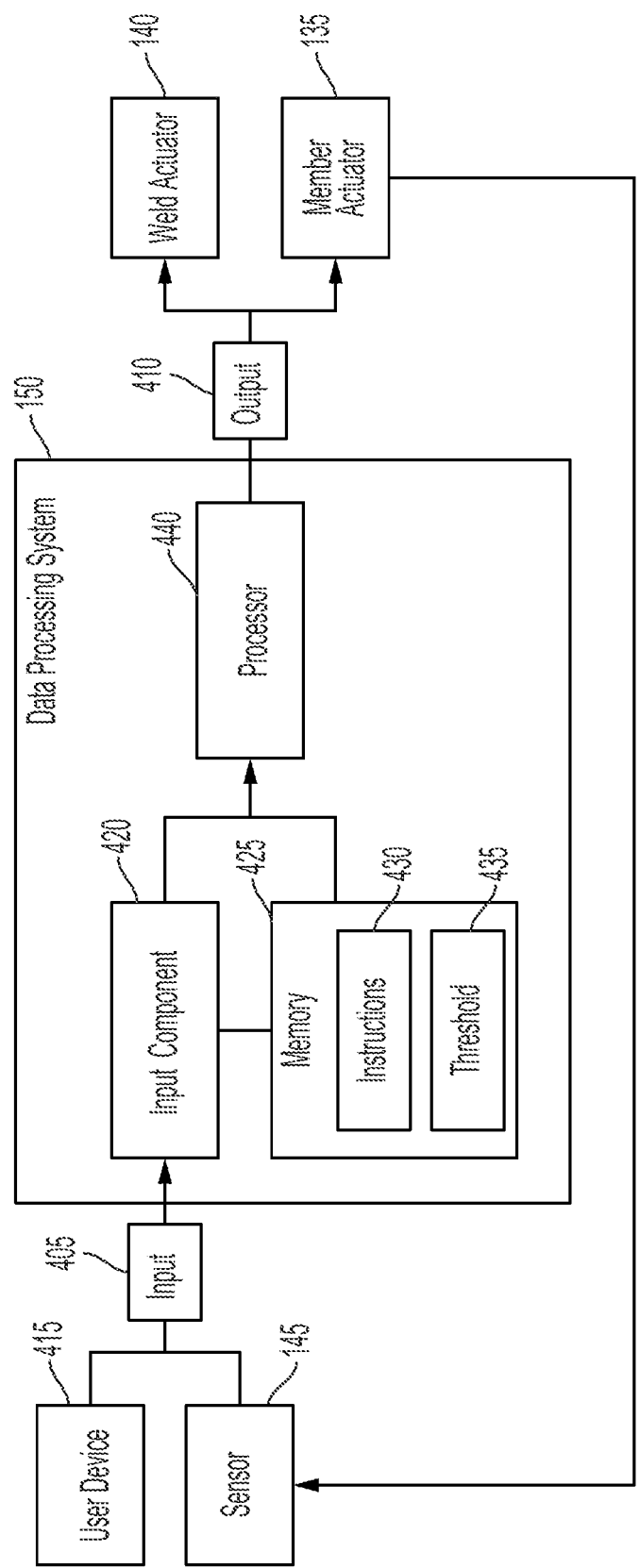
FIG. 4 is a schematic diagram of an example data processing system, according to some aspects.

FIG. 4 depicts an example schematic diagram of the data processing system 150. The data processing system 150 can receive, store, and analyze at least one input 405 and can generate at least one output 410. For example, the data processing system 150 can include at least one input component 420. The input component 420 can receive an input 405. For example, the input 405 can be a signal from a sensor 145 or data from a user device 415. The user device 415 can be any device capable of receiving input from a user and transmitting the input 405 to the input component 420 of the data processing system 150 (e.g., smart phone, laptop, computer, remote control, etc.). The input 405 can include any type of data or information related to the strapping device 100, or a component thereof. For example, the input 405 may be the signal from the sensor 145 indicating a current being drawn by the strapping device 100, a signal from the sensor 145 indicating a pressure applied to the member contact surface 310 of the grip member 130, or information provided by a user of the user device 415 indicating a characteristic of the welding component (e.g., material, thickness, etc.) or a characteristic of the strapping device 100 (e.g., age of device, number of welding cycles performed, etc.), among others.

The data processing system 150 can include at least one memory 425. The memory 425 can store the data from the inputs 405 received by the input component 420. For example, the memory 425 can store instructions 430 received from the user device 415. The instructions 430 can, for example, indicate settings or positions for components of the strapping device 100. For example, the instructions 430 can indicate a stored position 305 for the grip member 130. The instructions 430 can indicate that the stored position 305 includes the grip member 130 being disposed a predetermined distance 320 away from the base member 115. The predetermined distance 320 can be large enough to insert a welding component 110 into the strapping device 100. The instructions 430 can indicate when to move certain components of the strapping device 100, where to move the components, and how long to move the components, among others.

The memory 425 can store at least one threshold 435. The threshold 435 can be, for example, a current, an increase in current, a pressure, or a welding component thickness 340, among others. The threshold 435 can indicate which instruction 430 to apply. For example, detection of a current by the sensor 145 that exceeds a current threshold 435 can indicate that the grip member 130 is in a contact position 325 and that the strapping device 100 can determine a starting position 330 and move the grip member 130 to the starting position 330 (if necessary). Determination that a thickness 340 of the welding component 110 exceeds a threshold 435 can indicate which instruction 430 to use to determine at least one of the starting position 330 and the welding position 345 for the grip member 130. For example, a first thickness 340 that meets or exceeds a first threshold 435 can indicate a first starting position 330 and a second thickness 340 that meets or exceeds a second threshold can indicate a second starting position 330.

The thresholds 435 can be predefined values or can be adaptive values. For example, a threshold 435 can be adjusted or calculated in real-time (or near-real time) based on the input 405 received. For example, an electrical characteristic above a threshold 435 detected by the sensor 145 can indicate a starting position 330 for at least one component of the strapping device 100 (e.g., grip member 130, base member 115, compressible member 210). However, another sensor 145 can detect that the weld actuator 140 is uses too much power (e.g., an amount of power over a threshold value) to initiate a weld cycle with the component in the starting position 330 (e.g., the starting position 330 is applying too much pressure on the welding component 110). Accordingly, the data processing system 150 can be configured to modify the threshold 435 by, for example, adjusting the value of the threshold 435 or associating the threshold 435 with a different starting position 330. The threshold 435 can be modified based on a user input 405 from a user device 415. For example, a user can provide a value for a threshold 435 or an action associated with a threshold 435 from a remote location via the user device 415. The data processing system can receive the user input 405 and apply the updated threshold 435 to future weld cycles.

The data processing system 150 can include at least one processor 440. The processor 440 can analyze the input 405 received via the input component 420 and generate an output 410. The output 410 can be based, at least partially, on at least one of the input 405 received via the input component 420 and the data stored in the memory 425. The processor 440 can compare the input 405 to a threshold 435. For example, the input 405 can be a signal from the sensor 145 indicating a current being used by the member actuator 135. The processor 440 can compare the received current to a current threshold 435. The processor 440 can determine whether the received current meets or exceeds the current threshold 435. The processor 440 can apply the instructions 430 to the input 405 received and to the determinations made by the processor 440. For example, the instructions 430 can indicate that an input 405 that exceeds a threshold 435 can cause the processor 440 to generate a certain output 410. For example, the instructions 430 can indicate that when a current meets or exceeds a current threshold 435, the processor 440 can generate a specific control signal. The control signal can cause a component of the strapping device 100 to actuate or move. For example, the control signal can cause at least one of the member actuator 134 and the weld actuator 140 to actuate.

The data processing system 150 can determine and adjust a welding cycle of the strapping device 100 based, at least partially, on a thickness 340 of a welding component 110. For example, the data processing system 150 can determine when the grip member 130 is in contact with the welding component 110. The data processing system 150 can determine the grip member 130 is in contact with the welding component 110 based, at least partially, on input 405 received from the sensor 145. For example, the input 405 can be a signal from the sensor 145 indicating an electrical characteristic. The electrical characteristic can be associated with the member actuator 135, for example. The electrical characteristic can be a current drawn or used by the member actuator 135 to move the grip member 130 from the stored position 305 toward the welding component 110 or a pressure applied to the member contact surface 310 of the grip member 130, among others. The data processing system 150 can compare the electrical characteristic to a threshold 435 (e.g., a predetermined electrical threshold). The threshold 435 can be based, at least partially, on a characteristic of the strapping device 100 such that the threshold 435 is tailored to the specific strapping device 100. For example, the threshold 435 can be based on at least one of an age of the member actuator 135, performance data of the member actuator 135, and average performance data of a plurality of member actuators 135. The data processing system 150 can, for example, identify an increase in the current drawn by the member actuator 135 based on the comparison of the electrical characteristic and the threshold 435 (e.g., a first signal can indicate a current below the threshold and a second signal can indicate a current above the threshold). The threshold 435 can indicate when the grip member 130 contacts the welding component 110. For example, the increase in current can indicate an increase in mechanical resistance due to the grip member 130 being in contact with the welding component 110 and the extra power needed to push against the welding component 110. When the current detected by the sensor 145 exceeds a threshold 435, the data processing system 150 can determine that the grip member 130 is in contact with the welding component 110. The threshold 435 can differentiate a change in an electrical characteristic due to the grip member 130 contacting the welding component 110 from a change in the electrical characteristic due to a different factor (e.g., older components can use more current than new components).

The data processing system 150 can identify a position of the grip member 130 when the electrical characteristic meets or exceeds the threshold 435 and designate the position as the contact position 325. For example, the data processing system 150 can identify the contact position 325 when the current drawn by the member actuator 135 increases and meets or exceeds a predetermined current threshold 435. The data processing system 150 can store the contact position 325 in the memory 425.

The data processing system 150 can determine a thickness 340 of the welding component 110. For example, the data processing system 150 can determine the thickness 340 based, at least partially, on the contact position 325. For example, the data processing system 150 can determine the thickness 340 of the welding component 110 based, at least partially, on an electrical characteristic of a component of the strapping device 100 (e.g., when the electrical characteristic meets or exceeds a threshold 435) and a distance the grip member 130 has moved from the stored position 305 when the grip member 130 first contacts the welding component 110 (e.g., when the grip member 130 is in the contact position 325). For example, the data processing system 150 can determine a distance 320 between the base contact surface 315 and the member contact surface 310 when the grip member 130 is in the contact position 325. The distance 320 can be the thickness 340 of the welding component 110. A sensor 145 can, for example, detect the distance 320 between the base contact surface 315 and the member contact surface 310 or the data processing system 150 can subtract a distance that the grip member 130 has moved from an initial distance between the base contact surface 315 and the member contact surface when the grip member 130 was in the stored position 305.

The data processing system 150 can determine the starting position 330. The starting position 330 can be based, at least partially, on at least one of the contact position 325, the thickness 340 of the welding component 110, and the detected characteristic. For example, the instructions 430 can indicate that the starting position 330 is a position that is relative to the contact position 325. For example, the starting position 330 can include the grip member 130 being be a predetermined distance away from a position of the grip member 130 in the contact position 325. The instructions 430 can indicate that the starting position 330 is based on the thickness 340. For example, a first welding component 110 with a first thickness 340 can have a first starting position 330 with the grip member 130 a first distance away from the contact position 325 and a second welding component 110 with a second thickness 340 can have a second starting position 330 with the grip member 130 a second distance away from the contact position 325. The instructions 430 can indicate that the starting position 330 is based on the detected characteristic. For example, the starting position 330 of the grip member 130 can be above the contact position 325 of the grip member 130 based on the detected characteristic being above a threshold 435 and the distance to the starting position 330 can be based on the amount over the threshold 435 the characteristic is. The starting position 330 of the grip member 130 can be below the contact position 325 of the grip member 130 based on the detected characteristic being below the threshold 435 and the distance to the starting position 330 can be based on the amount over the threshold 435 the characteristic is. The starting position 330 can be at the contact position 325 based on the detected characteristic being at the threshold 435.

The starting position 330 can include the compressible member 210 being compressed or decompressed from the contact position 325. For example, the instructions 430 can indicate that the starting position 330 is a length 335 relative to the length 335 from the contact position 325. The starting position 330 can be based, at least partially, on a pressure applied to the welding component 110. For example, the instructions 430 can indicate a starting pressure. The member actuator 135 can adjust the length 335 of the compressible member 210 to achieve the starting pressure. The starting pressure can be based, at least partially, on the thickness 340 of the welding component 110.

The data processing system 150 can determine the welding position 345. The welding position 345 can be based, at least partially, on the thickness 340 of the welding component 110. For example, the instructions 430 can indicate a specific welding position 345 for a specific thickness 340. For example, the instructions 430 for a first welding position 345 for a first welding component 110 with a first thickness 340 can have the grip member 130 at a first position or the compressible member 210 at a first length 335 and a second welding position 345 for a second welding component 110 with a second thickness 340 can have the grip member 130 at a second position or the compressible member 210 at a second length 335. The instructions 430 can define the welding position 345 with an absolute value (e.g., a predetermined distance from the starting position 330), a relative value (e.g., a distance from the starting position 330 that is a predetermined percentage of the thickness 340), or a dependent value (e.g., a distance based on when a sensor 145 detects a characteristic that meets or exceeds a threshold 435).

The data processing system 150 can determine at least one welding cycle parameter. The welding cycle parameter can include at least one of a motor starting position, a welding time, a cooling time, a holding position, a welding pressure, and an actuator speed (e.g., speed of the weld actuator 140 to move the actuator portion 125, speed of the member actuator 135 to move the grip member 130). The welding cycle parameter can be based, at least partially, on a characteristic of the welding component 110. For example, the characteristic of the welding component 110 can be the thickness 340 of the welding component 110 or a material of the welding component 110. The data processing system 150 can determine the material of the welding component 110 from an input 405 received from either a sensor 145 (e.g., sensor 145 detect activation of a switch on the strapping device 100 indicative of a specific material) or a user device 415 (e.g., user inputs a specific material to be welded). The welding cycle parameter(s) for a first welding component 110 made of a first material can be different than the welding cycle parameter(s) for a second welding component 110 made of a second material. For example, the first material may require a faster actuator speed and a longer cooling time. The welding parameter(s) for a first welding component 110 with a first thickness 340 can be different than the welding parameter(s) for a second welding component 110 with a second thickness 340. The data processing system 150 can compare the characteristic(s) of the welding component 110 with the instructions 430 and the thresholds 435 and determine a welding cycle that is customized for the specific welding component 110 and the strapping device 100.

The data processing system 150 can generate at least one output 410. The output 410 can be based on the input 405 received by the input component 420 and the data stored in the memory 425. The output 410 can be a control signal that the data processing system 150 can transmit to a component of the strapping device 100 to facilitate activation and completion of a welding cycle. For example, the data processing system 150 can generate a control signal to adjust the pressure applied to the welding component 110 by either adjusting the location of the grip member 130 or compressing or decompressing the compressible member 210. The data processing system 150 can generate a control signal to actuate the member actuator 135 to move the grip member 130 or the compressible member 210 from the contact position 325 to the starting position 330. The data processing system 150 can generate and transmit the signal based on the grip member 130 being in contact with the welding component 110. The data processing system 150 can generate a control signal to actuate the weld actuator 140 to move at least one of the actuator portion 125 of the welding component 110 relative to the base portion 120 and the base member 115 relative to actuator portion 125 to initiate a welding cycle to weld the welding component 110. The data processing system 150 can transmit the control signal such that the welding cycle initiates with the grip member 130 and the compressible member 210 at the starting position 330. The data processing system 150 can generate a control signal to actuate the member actuator 135 to move the grip member 130 or the compressible member 210 from the starting position 330 to the welding position 345. The control signal can indicate a rate at which to move the grip member 130 or the compressible member 210 from the starting position 330 to the welding position 345. The control signal can indicate to hold the grip member 130 or the compressible member in the welding position 345 until the end of the welding cycle. The data processing system 150 can generate a control signal to actuate the member actuator 135 to move the grip member 130 or the compressible member from the welding position 345 to the stored position 305. The data processing system 150 can generate a control signal that indicates a welding cycle parameter (e.g., welding time, cooling time, actuator speed, etc.). The welding cycle parameter can be based on the thickness 340 of the welding component 110. The data processing system 150 can generate any number of control signals, and each control signal can include any number of commands (e.g., a single control signal can cause multiple components to move). The data processing system 150 can generate control signals to move the components of the strapping device 100 between any of the positions in any order.

The data processing system 150 can analyze the inputs 405 and generate the outputs 410 in real time or in near-real time such that the welding cycle can be a continuous process that is completed in a short amount of time. For example, the welding cycle can be completed in less than five seconds (e.g., the welding cycle can be completed in less than 3 seconds).

Figure 5:
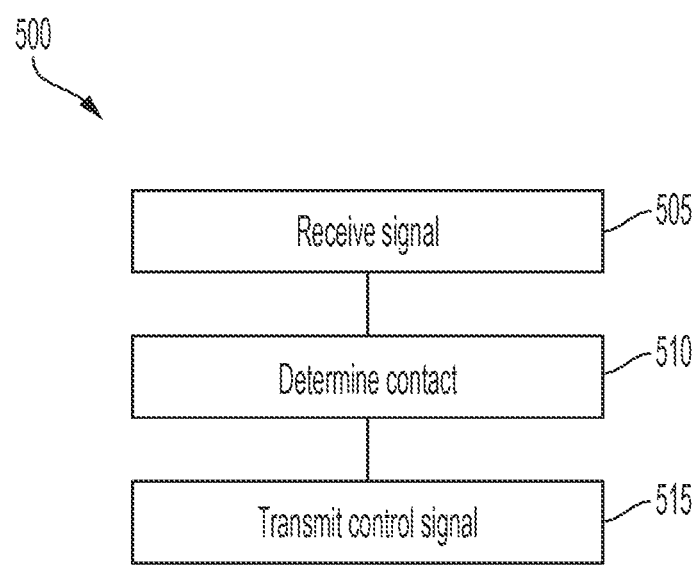
FIG. 5 is a flow diagram depicting an example method, according to some aspects.

FIG. 5 is a flow diagram depicting a method 500. The method 500 can be a method of adjusting a strapping device 100 to accommodate different welding components 110. The method 500 can include receiving at least one signal (Act 505), determining a contact (Act 510), and transmitting a control signal (Act 515). Act 505 of receiving a signal can include a data processing system 150 receiving a signal from a sensor 145. The signal can include data that indicates a characteristic of a component(s) of the strapping device 100. For example, the characteristic can be an electrical characteristic. The electrical characteristics can be associated with a member actuator 135 of the strapping device 100. The electrical characteristic can be, for example, a current or a change in the current being used by the member actuator 135 to move a member of the strapping device 100 (e.g., grip member 130, base member 115). Other electrical characteristics can include, for example, a resistance felt by the member actuator 135 or a pressure felt by the grip member 130 or base member 115. The characteristic can be a physical characteristic of the strapping device 100. For example, the physical characteristic can be a distance between two components (e.g., distance between a member contact surface 310 of the grip member 130 and an actuator portion 125 of a welding component 110). The sensor 145 can detect the characteristic of the component(s) of the strapping device 100 and transmit a signal to the data processing system 150 indicative of the characteristic.

Act 510 of determining a contact can include analyzing the received signal. For example, the data processing system 150 can compare the characteristic from the signal with a threshold 435 stored in the memory 425 of the data processing system 150. The threshold 534 can indicate when the grip member 130 contacts the welding component 110. For example, the signal can include data indicative of a current being used by the member actuator 135 to move the grip member 130 or the base member 115 from the stored position 305 toward the contact position 325. The data processing system 150 can compare the current to a predetermined current threshold 435. The threshold 435 can be a value of a current that indicates the grip member 130 is in contact with the welding component 110. For example, the current used by the member actuator 135 can spike or increase when the grip member 130 contacts the welding component 110 due to the force applied to the grip member 130 by the welding component 110. The data processing system 150 can determine that a contact is made between the grip member 130 and the welding component 110 when the detected current meets or exceeds the predetermined current threshold 435.

Determining the contact at act 510 can include determining a contact position 325. The data processing system 150 can determine the contact position 325 by measuring a distance between the member contact surface 310 and the base contact surface 315 or identifying a distance the grip member 130 moved between the stored position 305 and the contact position 325, for example. The data processing system 150 can store the contact position in the memory 425.

Act 515 of transmitting a control signal can include generating a control signal to move at least one of the grip member 130 and the compressible member 210 from the contact position 325 to a starting position 330. Act 515 can include the data processing system 150 determining the starting position 330. The starting position 330 can be based, at least partially, on the contact position 325. For example, the starting position 330 can be a predetermined distance away from the contact position 325. The starting position 330 can be based, at least partially, on a thickness 340 of the welding component 110. Act 515 can include the data processing system 150 determining the thickness 340 of the welding component 110. For example, the data processing system 150 can measure or calculate the thickness 340 based on, for example, the contact position 325. The distance between the member contact surface 310 and the base contact surface 315 when the grip member 130 is in the contact position 325 can be the thickness 340 of the welding component 110. The instructions can associate a larger thickness 340 with a larger predetermined distance and a smaller thickness 340 with a smaller predetermined distance, or vice versa. The data processing system 150 can apply the instructions based on the determined thickness 340. The starting position 330 can be based, at least partially, on the characteristic indicated by the signal. For example, the data processing system 150 can determine how much a current of the member actuator 135 is over or under a threshold 435, and move the grip member 130 in a direction a distance from the contact position 325 based on the amount over or under the current it. The data processing system 150 can determine the starting position 330 is the same position as the contact position 325.

The data processing system 150 can generate the control signal based on the starting position 330. For example, the data processing system 150 can transmit the control signal to the member actuator 135 to move at least one of the grip member 130 and the compressible member 210 to the starting position 330. The starting position 330 can be the same as the contact position 325. As such, the data processing system 150 can not generate a control signal to move the grip member 130 and the compressible member 210 from the contact position 325.

Act 515 of transmitting a control signal can include generating a control signal to initiate a welding cycle. Act 515 can include the data processing system 150 determining the welding cycle parameters for a welding cycle. For example, the data processing system 150 can determine at least one of a welding time, a cooling time, a member actuator 135 speed, and a weld actuator 140 speed, among others. The welding cycle parameters can be based, at least partially, on characteristics of the welding component 110 (e.g., thickness 340 and material). The data processing system 150 can transmit a signal to the member actuator 135 and the weld actuator 140 to initiate the welding cycle according to the welding cycle parameters.

As an example of the method 500, a sensor 145 can detect a current of the member actuator 135. The sensor 145 can transmit a signal to the data processing system 150 indicating the current of the member actuator 135. The data processing system 150 can compare the current to a predetermined current threshold 435. The data processing system 150 can determine the current meets or exceeds the predetermined current threshold 435 and identify the contact position 325 based on the current meeting or exceeding the predetermined current threshold 435. The data processing system 150 can determine a thickness of the welding component 110 based on the contact position 325. The data processing system 150 can determine welding cycle parameters based on the thickness of the welding component 110, including the starting position 330. The starting position 330 may include the grip member 130 remaining in the same position and adjusting the length 335 of the compressible member 210 to adjust the pressure applied to the welding component 110. The data processing system 150 can transmit a first control signal to the member actuator 135 to compress or decompress the compressible member 210 to the starting position 330 if the starting position 330 is not the same as the contact position 325. The data processing system 150 can transmit a second control signal to the member actuator 135 and the weld actuator 140 to initiate the welding cycle in accordance with the welding cycle parameters. The second control signal can cause at least one of the grip member 130 and the compressible member 210 to move to the welding position 345 and remain in the welding position 345 until the end of the welding portion and the cooling portion of the welding cycle. After the cooling portion, the data processing system 150 can transmit a third control signal to cause the grip member 130 and the compressible member 210 to move to the stored position 305.

Figure 6:
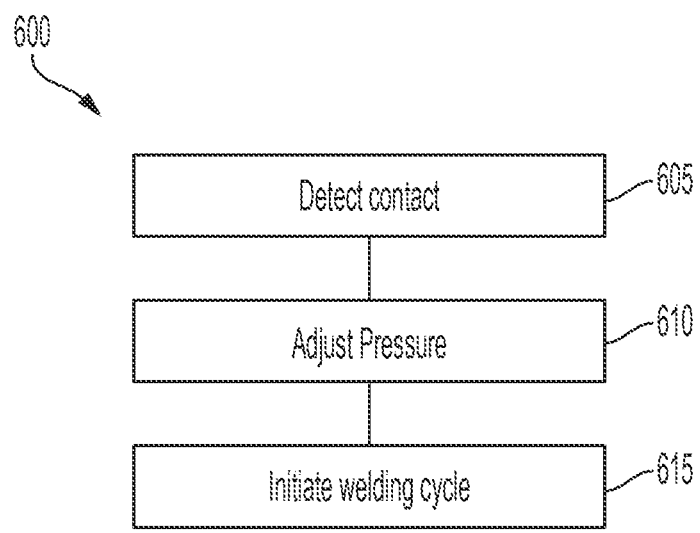
FIG. 6 is a flow diagram depicting an example method, according to some aspects.

FIG. 6 is a flow diagram depicting a method 600. The method 600 can be a method of adjusting a strapping device 100 to accommodate different welding components 110. The method 600 can include detecting a contact (Act 605), adjusting a pressure (Act 610), and initiating welding of a welding component (Act 615). Act 605 of detecting a contact can include moving a grip member 130 from a stored position 305 toward a welding component 110. A sensor 145 can detect a characteristic (e.g., an electrical characteristic) of a component of a strapping device 100 as the grip member 130 moves toward the welding component 110. For example, the sensor 145 can detect a current being used by the member actuator 135. Act 605 can include the sensor 145 transmitting a signal to the data processing system 150 indicating the characteristic. For example, the signal can indicate the current of the member actuator 135. Act 605 can include comparing the characteristic to a threshold 435. The data processing system 150 can determine whether the grip member 130 has contacted the welding component 110 based on the comparison of the characteristic with the threshold 435. For example, the data processing system 150 can determine the grip member 130 is contacting the welding component 110 when the detected current exceeds a predetermined current threshold 435. The data processing system 150 can identify the contact position 325 of the grip member 130 based on where the grip member is when the sensor 145 detects the characteristic that meets or exceeds the threshold 435.

Act 610 of adjusting a pressure can include moving at least one of the grip member 130 and the compressible member 210 to a starting position 330 from the contact position 325. The data processing system 150 can determine the starting position 330 based, at least partially, on the thickness 340 of the welding component 110. The data processing system 150 can determine at least one welding cycle parameter (e.g., welding time, cooling time, welding position, welding pressure, actuator speed, etc.) based, at least partially, on the thickness 340 of the welding component 110. The data processing system 150 can generate a first control signal to cause the member actuator 135 to move the grip member 130 to the starting position 330 if the starting position 330 is not the same as the contact position 325. The member actuator 135 can receive the first control signal and move the grip member 130 according to the first control signal.

Act 615 of initiating welding can include initiating a welding cycle. With the grip member 130 and the compressible member 210 in the starting position 330, the data processing system 150 can transmit a second control signal to cause the weld actuator 140 to move at least one of the actuator portion 125 of the welding component 110 and the base member according to the determined welding cycle parameters and to cause the member actuator 135 to move at least one of the grip member 130 and the compressible member 210 to the welding position 345 according to the determined welding cycle parameters.

Method 600 can also apply to a strapping device 100 that includes the member actuator 135 coupled with the base member 115 and the weld actuator 140 coupled with at least one of the actuator portion 125 of the welding component 110 and the grip member 130.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing system" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of up and down may be reversed. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A strapping device, comprising:
   a first member;
   a second member opposite the first member;
   a first actuator coupled with the first member to move the first member between a first position and a second position;
   a sensor to detect an electrical characteristic of the first actuator with the first member at the first position and to transmit a signal indicative of the electrical characteristic; and
   a data processing system configured to:
      receive the signal indicative of the electrical characteristic;
      determine the first member is in contact with a welding component based on the electrical characteristic;
      determine the second position of the first member based on the first member being in contact with the welding component;
      transmit a first control signal to the first actuator to move the first member to the second position to adjust a pressure the first member applies to the welding component; and
      transmit a second control signal to the first actuator and a second actuator to initiate a welding cycle to weld the welding component such that the welding cycle initiates with the first member at the second position.

2. The strapping device of claim 1, comprising:
   the data processing system configured to:
      compare the electrical characteristic with a predetermined electrical threshold, the predetermined electrical threshold based on at least one of an age of the first actuator, performance data of the first actuator, and average performance data of other actuators.

3. The strapping device of claim 1, comprising:
   the data processing system is configured to:
      identify an increase in a current of the first actuator based on the electrical characteristic;
      identify a contact position of the first member when the increase in the current occurs;
      determine a thickness of the welding component based on the contact position; and
      determine the second position based on the thickness of the welding component.

4. The strapping device of claim 1, comprising:
   the data processing system is configured to:
      determine a thickness of the welding component based on the electrical characteristic;
      determine a distance the first member has moved from a stored position when the first member contacts the welding component at the first position; and
      determine the second position based on the thickness of the welding component.

5. The strapping device of claim 1, comprising:
   the data processing system is configured to determine a thickness of the welding component; and
   the control signal comprising a welding cycle parameter based on the thickness of the welding component, the welding cycle parameter comprising at least one of a welding time, a cooling time, a welding pressure, and an actuator speed for at least one of the first actuator and the second actuator.

6. The strapping device of claim 1, comprising:
   the electrical characteristic being a current used to power the first actuator, an increase in the current indicative of an increase of mechanical resistance due to the first member being in contact with the welding component.

7. The strapping device of claim 1, comprising:
   the first actuator to move the first member in a first direction to contact the welding component; and
   the first actuator to move the first member in a second direction to move the member to the second position, the second direction opposite the first direction.

8. The strapping device of claim 1, comprising:
   the first member to interface with a first portion of the welding component;
   the second member to interface with a second portion of the welding component; and
   the second actuator to move the first portion of the welding component relative to the second portion to weld the first portion with the second portion via friction welding.

9. The strapping device of claim 1, comprising:
   the second member to support a first portion and a second portion of the welding component;
   a first grip coupled with the first member, the first grip to interface with the first portion of the welding component and increase friction between the first portion of the welding component and the first member during the welding cycle; and a second grip coupled with the second member, the second grip to prevent the second portion of the welding component from moving;

the first portion and the second portion of the welding component disposed between the first grip and the second grip.

10. The strapping device of claim 1, comprising:
the second position is a motor starting position such that the second actuator actuates to initiate the welding cycle with the first member in the motor starting position.

11. The strapping device of claim 1, comprising:
the data processing system is configured to:
  determine a thickness of the welding component; and
  determine a third position for the first member, the third position based on the thickness of the welding component;
  the control signal to cause the first actuator to move the first member to the third position during the welding cycle and hold the first member at the third position during cooling of the welding component.

12. The strapping device of claim 1, comprising:
a cam coupled with the first actuator, the first actuator to rotate the cam and the cam to move the first member.

13. The strapping device of claim 1, comprising:
a compressible member disposed between the first member and the first actuator, the first actuator to compress or decompress the compressible member to adjust a pressure applied to the welding component via the first member.

14. The strapping device of claim 1, comprising:
the second position of the first member to provide a desired pressure to the welding component, the desired pressure based on a thickness of the welding component.

15. A method, comprising:
moving a first member of a strapping device toward a second member of the strapping device via an actuator of the strapping device to a first position, a welding component disposed between the first member and the second member;
receiving a signal indicative of an electrical characteristic of the actuator;
determining at least one of the first member and the second member is contacting the welding component based on the electrical characteristic;
determining a second position for the first member based on the at least one of the first member and the second member contacting the welding component;
transmitting a first control signal to the actuator to move the first member to the second position to adjust a pressure the first member applies to the welding component; and
transmitting a second control signal to initiate a welding cycle to friction weld the welding component such that the welding cycle initiates with the first member at the second position.

16. The method of claim 15, comprising:
detecting the electrical characteristic of the actuator, the electrical characteristic indicative of the one of the first member and the second member contacting the welding component; and
comparing the electrical characteristic with an electrical threshold, the electrical threshold based on at least one of an age of the actuator, performance data of the actuator, and average performance data of a plurality of other actuators.

17. The method of claim 15, comprising:
detecting an increase in a current of the actuator;
identifying a contact position of the at least one of the first member and the second member when the increase in the current occurs;
determining a thickness of the welding component based on the contact position; and
determining the second position based on the thickness of the welding component.

18. The method of claim 15, comprising:
determining a thickness of the welding component; and
adjusting a welding cycle parameter based on the thickness of the welding component, the welding cycle parameter comprising at least one of a welding time, a cooling time, a welding pressure, and an actuator speed for the welding cycle.

* * * * *